United States Patent [19]

Silveri

[11] Patent Number: 5,221,444
[45] Date of Patent: Jun. 22, 1993

[54] ELECTROLYTIC POOL PURIFIER SYSTEM

[76] Inventor: Michael A. Silveri, 483 Skylake Ct., Incline Village, Nev. 89451

[21] Appl. No.: 792,800

[22] Filed: Nov. 15, 1991

[51] Int. Cl.⁵ .................. C02F 1/467; C25B 15/02; C25B 15/08
[52] U.S. Cl. .................. 204/149; 204/228; 204/229; 204/237
[58] Field of Search .............. 204/228, 237, 149, 229

[56] References Cited

U.S. PATENT DOCUMENTS

| | | | |
|---|---|---|---|
| 3,222,269 | 12/1965 | Stanton | 204/270 |
| 3,305,472 | 2/1967 | Oldershaw et al. | 204/268 |
| 3,351,542 | 11/1967 | Oldershaw et al. | 204/149 |
| 3,458,414 | 7/1969 | Crane et al. | 204/149 |
| 3,669,857 | 6/1972 | Kirkham et al. | 204/151 |
| 3,766,045 | 10/1973 | Itakura et al. | 204/275 |
| 3,835,018 | 9/1974 | Casanovas et al. | 204/228 |
| 3,835,020 | 9/1974 | Galneder | 204/268 |
| 4,085,028 | 4/1978 | McCallum | 204/269 |
| 4,100,052 | 7/1978 | Stillman | 204/268 |
| 4,193,858 | 3/1980 | King | 204/268 |
| 4,202,738 | 5/1980 | Stillman | 204/95 |
| 4,255,246 | 3/1981 | Davis et al. | 204/228 |
| 4,337,136 | 6/1982 | Dahlgren | 204/242 |
| 4,363,713 | 12/1982 | Bindon | 204/278 |
| 4,419,207 | 12/1983 | Bindon | 204/237 |
| 4,422,919 | 12/1983 | Fabian et al. | 204/270 |
| 4,472,256 | 9/1984 | Hilbig | 204/266 |
| 4,492,618 | 1/1985 | Eder | 204/152 |
| 4,525,253 | 6/1985 | Hayes et al. | 204/149 |
| 4,555,323 | 11/1985 | Collier | 204/258 |
| 4,565,617 | 1/1986 | Ahuja | 204/229 |
| 4,714,534 | 12/1987 | Fair et al. | 204/269 |
| 4,790,923 | 12/1988 | Stillman | 204/268 |
| 4,936,979 | 6/1990 | Brown | 204/237 X |
| 4,986,906 | 1/1991 | Dadisman | 204/228 X |
| 4,992,156 | 2/1991 | Silveri | 204/228 |
| 4,997,540 | 3/1991 | Howlett | 204/271 |
| 5,013,417 | 5/1991 | Judd, Jr. | 204/228 |
| 5,034,110 | 7/1991 | Glore et al. | 204/228 |
| 5,059,296 | 10/1991 | Sherman | 204/228 |

Primary Examiner—Donald R. Valentine
Attorney, Agent, or Firm—Knobbe, Martens, Olson & Bear

[57] ABSTRACT

An electrolytic pool purifier system for purifying water in a swimming pool. The system includes an electrolytic cell, located at the discharge end of a water circulation line, and a control circuit The control circuit includes a pump sense circuit for sensing the initiation of the pool pump cycle so as to maximize concurrent operation of the pump and the cell. The control circuit further includes a low current shutdown circuit for terminating operation of the system when a fault in the cell causes a reduction in control circuit current. The low current shutdown circuit includes a current monitor circuit that permits the indirect measurement of current with a voltmeter.

15 Claims, 16 Drawing Sheets

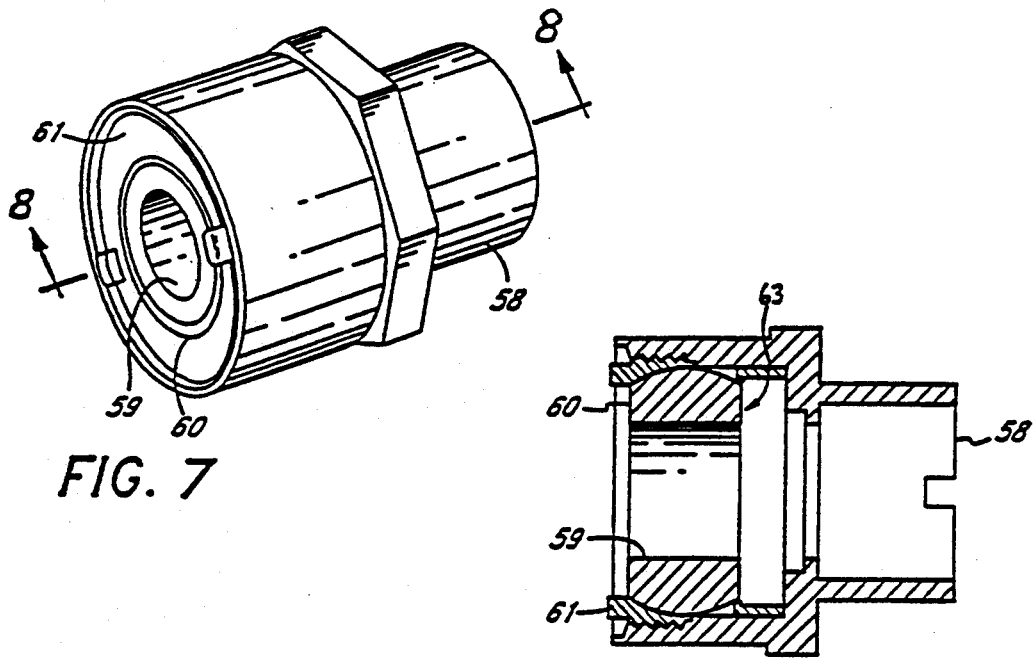
FIG. 7
FIG. 8
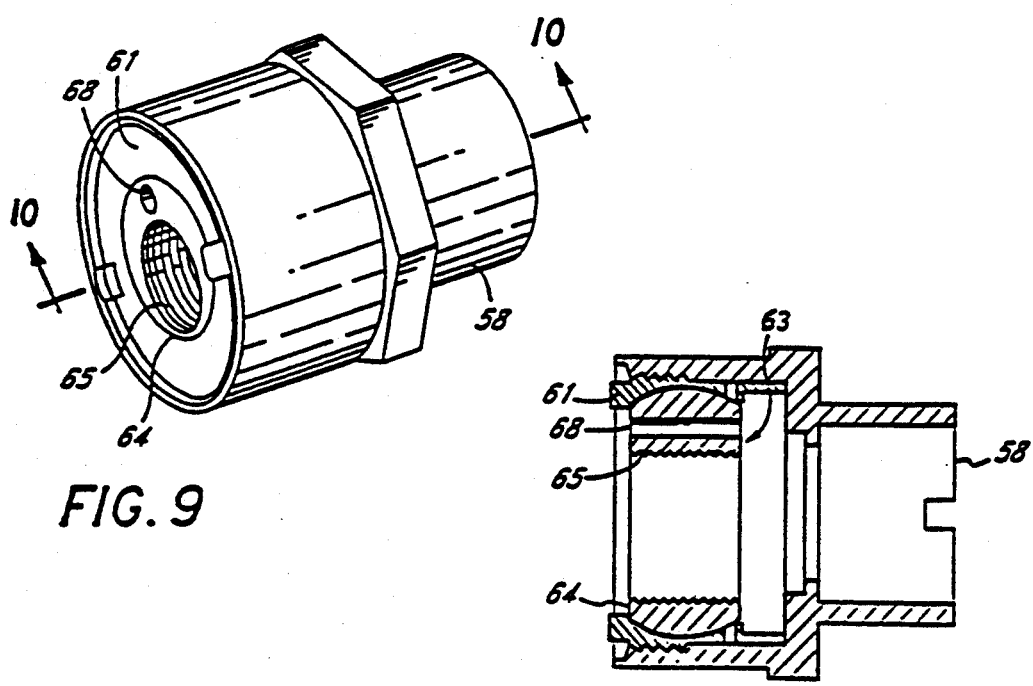
FIG. 9
FIG. 10

ELECTROLYTIC POOL PURIFIER SYSTEM

BACKGROUND OF THE INVENTION

1. Field of the Invention

The present invention relates to pool maintenance, and more particularly to a water purification system.

2. Description of Related Art

Sodium hypochlorite is commonly used as a sanitizing agent in swimming pools, and the like, to control bacteria growth. Typical pool maintenance requires adding liquid sodium hypochlorite to pool water. Some pool owners, however, use electrolytic cell devices in their pools or in their filtration systems to produce sodium hypochlorite by electrolysis. Examples of electrolytic cells used to generate sanitizing agents are disclosed in U.S. Pat. Nos. 4,992,156 and 4,790,923.

In water having a hardness greater than 700 parts per million ("hard water"), scale deposits from the water and builds up on surfaces adjacent to a water flow. If an electrolytic cell—and for that matter, pool equipment in general—is used in hard water, scale build-up causes water flow problem. Scale typically builds up and clogs small openings and conduits in the equipment. Thus, some manufacturers recommend using their equipment in water having a total hardness less than 500 parts per million.

Conventional electrolytic chlorinators, such as the Lectranator available from Lectranator of Cleveland, Ohio, depend on the water flow through the pool circulation system for proper operation. Such chlorinators, or purifiers, are typically wired in parallel with the pool pump motor and hence are active whenever the pool pump is running. They must not run when the pump is off since hydrogen and oxygen will be produced and entrapped inside the chlorinator, thereby providing the potential for an explosion.

Some models of the Lectranator, as well as other in-line electrolytic chlorinators, operate for a variable percentage of time. For instance, the chlorinator power supply includes a timer that can be set to operate for a twenty minute cycle. If a dial, controlling variable percentage of operation time, is set at "5" (on a scale of 1-10), the power supply will remain on for 50% of the twenty minute cycle or ten minutes and then remain off for ten minutes.

Other pool purifiers, such as disclosed in U.S. Pat. No. 4,992,156, and in the copending application entitled "Electrolytic Poll Purifier", Ser. No. unknown, which are incorporated by reference herein, are designed to operate independently of the pool pump. Such chlorinators will operate 24 hours per day, and at a setting of "5", as in the case above, will only operate about 50% of the time that the pool circulation system is active. Under most circumstances this does not affect operation, but under hard water conditions, it is desirable to operate during as much of the circulation system running time as possible to dislodge scale and physically remove it from the cell.

Present chlorinators typically cycle 70 or more times per day. Thermal cycling is a leading cause of failure in many components with solid state electronics. It would thus be desirable to substantially reduce chlorinator cycles so as to extend the life of the control electronics, particularly power devices.

Running more of the time that the pool circulation operates also improves distribution of products of electrolysis. The chlorine and nascent oxygen will better diffuse throughout the pool. Efficiency will improve due to reduced scale build-up on the openings of the purifier. Consequently, a need exists to coordinate the operation of the pool filtration pump and the purification system.

Fault conditions such as scaling, electrode failure, wire short circuits or low salt level may occur in an electrolytic purifier. A means to detect such conditions and take action to prevent further damage to the purifier is needed.

SUMMARY OF THE INVENTION

An object of the present invention is to control the start of the chlorinator cycle so that it coincides with the start of the pool filtration system and then allows the chlorinator to continue until the completion of its present cycle length, time out, and then wait for the next pump cycle start. The function of sensing the activation of the pump is called the "pump sense" function.

In one aspect of the invention, there is a swimming pool having a water circulation line, a pump for pumping water through the circulating line and a pump timer for activating the pump at a first time and deactivating the pump at a second time, and a pool purifying apparatus comprising an electrolytic cell having electrodes mounted beneath the water level of the pool, a conductor for connecting the electrolytic cell to a source of electrical power, and a control circuit for controlling the electrical power to the conductor, the circuit sensing actuation of the pump, and connecting the conductor to the source of power such that power is supplied to the electrolytic cell, the circuit having a timing device which causes the power to the electrolytic cell to be interrupted independently of the pump at a third time different than the second time.

In another aspect of the present invention, there is a method of operating a pool purifying apparatus having an electrolytic cell mounted beneath the water level of a pool, the method comprising energizing the electrolytic cell in response to activating of a pool water circulating pump, using the pool pump to continuously circulate the pool water for a first period of time, deactivating the pool pump upon completion of the first period of time, using the electrolytic cell to continuously purify pool water for a second period of time different than the first period of time, and deactivating the electrolytic cell upon completion of the second period of time.

In yet another aspect of the present invention, there is a swimming pool having a water circulation line, and a pump for pumping water through the circulation line, a pool purifying apparatus comprising an electrolytic cell having electrodes mounted beneath the water level of the pool, a conductor for connecting the electrolytic cell to a source of electrical power, and a shutdown circuit for terminating power to the electrolytic cell when the amount of current in the conductor drops below a threshold level.

Another aspect of the present invention is a swimming pool having a water circulation line, and a pump for pumping water through the circulation line, a pool purifying apparatus comprising an electrolytic cell having electrodes mounted beneath the water level of the pool, a conductor for connecting the electrolytic cell to a source of electrical power, and a control circuit for controlling the electrical power to the conductor, the circuit comprising a circuit element having two terminals, the circuit element generating a voltage across the two terminals which is directly proportional to the current through the conductor to permit the current to be monitored by measuring the voltage.

BRIEF DESCRIPTION OF THE DRAWINGS

FIG. 7 is a perspective view of a unmodified pool fitting;

FIG. 8 is a cross-sectional view taken along line 8—8 of FIG. 7;

FIG. 9 is a perspective view of the pool fitting of FIG. 7, with a directional nozzle configured in accordance with the present invention inserted into the fitting;

FIG. 10 is a cross-sectional view taken along line 10—10 of FIG. 9;

DETAILED DESCRIPTION OF THE PREFERRED EMBODIMENT

Figure 1:
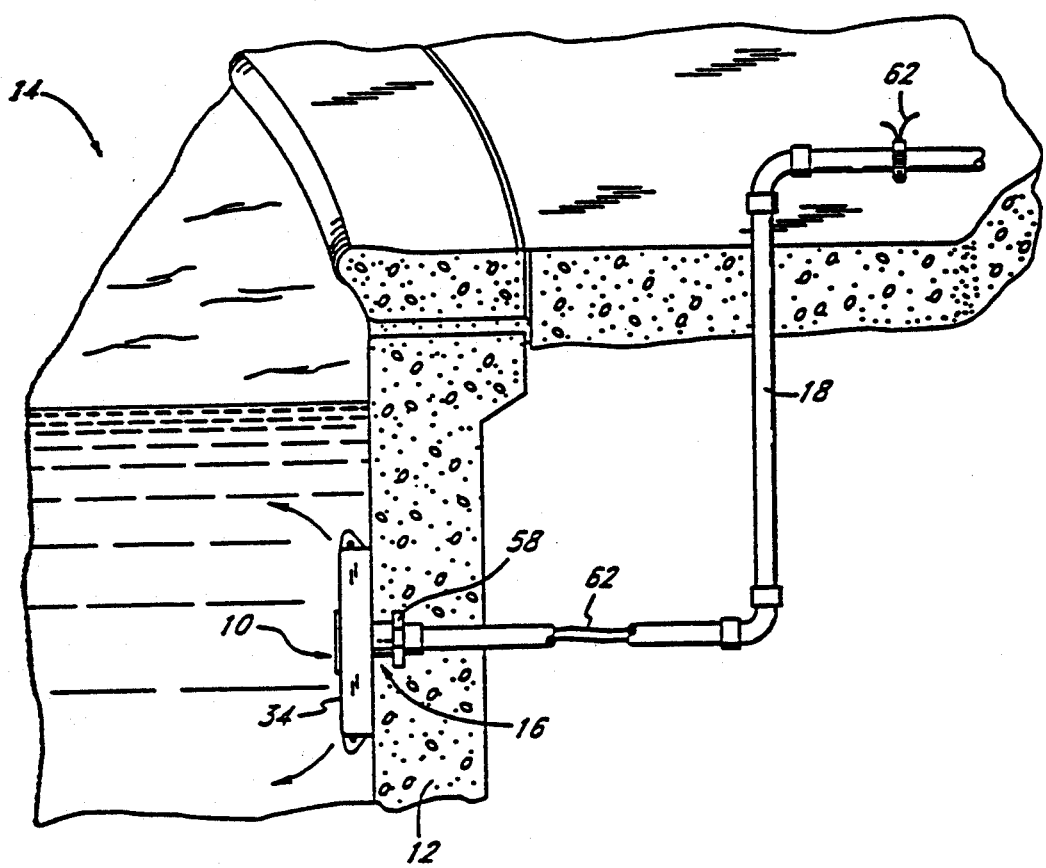
FIG. 1 illustrates a water purifier in accordance with one embodiment of the present invention attached to a side wall of a swimming pool.

FIG. 1 illustrates a sanitizing apparatus or purifier 10 of the present invention secured to a wall 12 of a swimming pool 14. Although the discussion of the purifier 10 proceeds in connection with a swimming pool, it is understood that the purifier 10 can also work with a spa (e.g., Jacuzzi ®), water fountain and the like.

Figure 2:
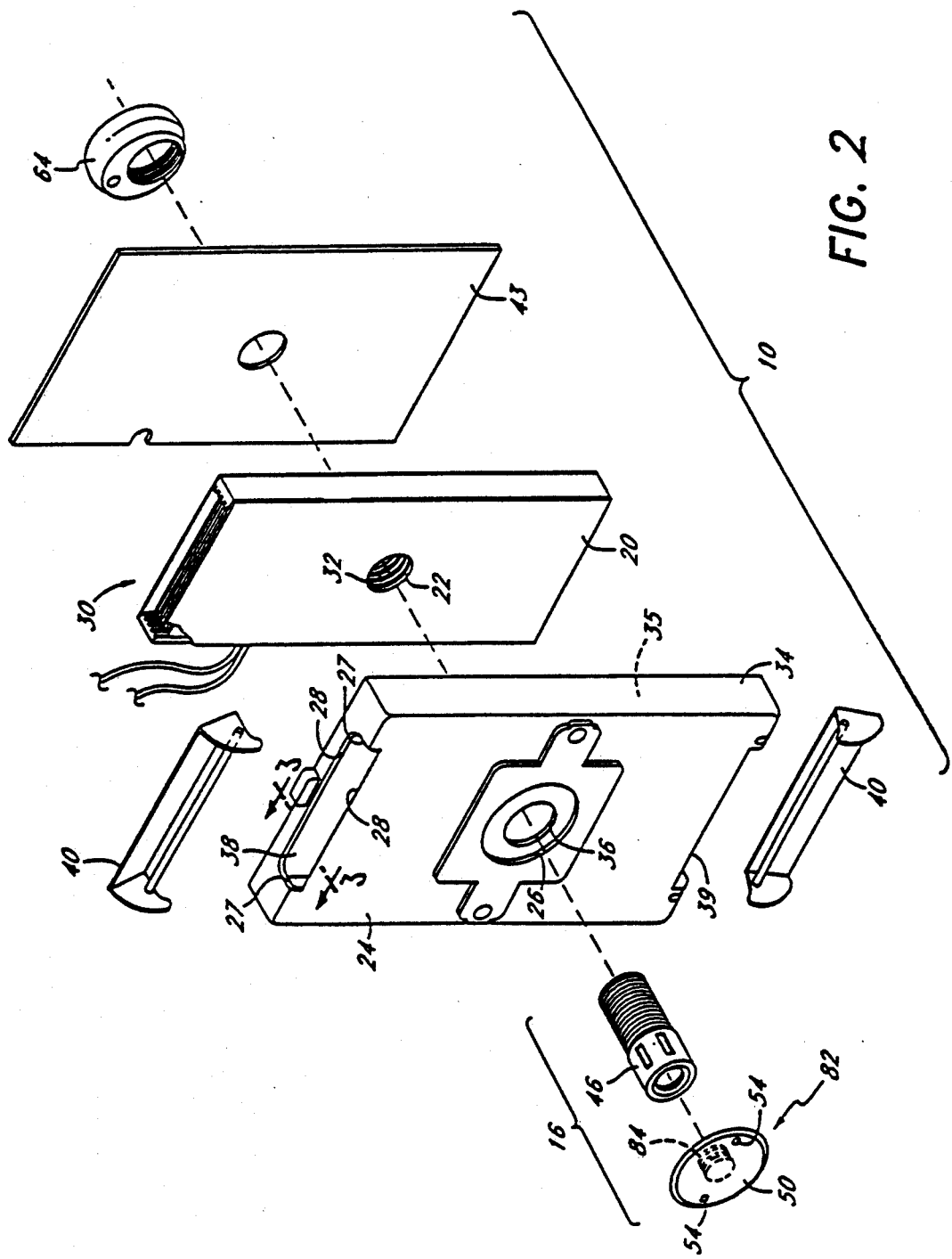
FIG. 2 is an exploded perspective view of the purifier of FIG. 1.

Referring to FIGS. 1 and 2, the purifier 10 comprises an electrolytic cell 30 housed in an enclosure 34 and an attaching apparatus 16 for securing the electrolytic cell 30 to the pool wall 12. The attaching apparatus 16 is located at an exit port of a water circulation line 18. As a result, pressurized water exiting the water circulation line 18 flows through the enclosure 34, passing over the electrolytic cell 30. The resulting water stream aids in reducing scale build-up on the electrolytic cell 30, the enclosure 34 and the attaching apparatus 16. A pair of electrical wires 62 are connected to the electrolytic cell 30. The wires are threaded through a portion of the water circulation line 18. The wires 62 connect the purifier 10 with a control system which is further discussed below with reference to FIGS. 17-19.

As illustrated in FIG. 2, the electrolytic cell 30 is generally configured in accordance with the teachings of U.S. Pat. No. 4,992,156, issued on Feb. 12, 1991, which is hereby incorporated by reference. The electrolytic cell 30 comprises a plurality of juxtaposed electrode plates 20. Each electrode plate 20 has a rectangular shape and defines an aperture 22 at its center. As juxtaposed, the electrode plates 20 define a cylindrical bore 32 having an axis perpendicular to the electrode plates 20.

The enclosure 34 fully encompasses the electrolytic cell 30 within an internal cavity 35. The enclosure 34 is molded of a thermoplastic, and defines an aperture 36 extending through the enclosure 34; the aperture 36 aligns with the bore 32 of the electrolytic cell in assembly As a result, a portion of the attaching apparatus 16 (namely a nipple 46) passes partially through the enclosure 34 and the electrolytic cell 30 in assembly. A front panel 24 of the enclosure includes a recess 26 having a larger diameter than the aperture 36 and circumscribing the aperture 36.

The enclosure 34 additionally comprises a top opening 38 and a bottom opening 39, providing exit ports for water flowing through the enclosure 34 from the water circulation line 18. The openings 38, 39 also provide a flow path for water circulating through the enclosure 34 as a result of the electrolytic process. With a circulation pump off, the electrolysis generates gaseous bubbles which travel through the enclosure 34 towards the surface of the pool water. The natural movement of the bubbles produces a current flow of water through the enclosure 34, entering through the bottom opening 39 and exiting through the top opening 38.

Figure 3:
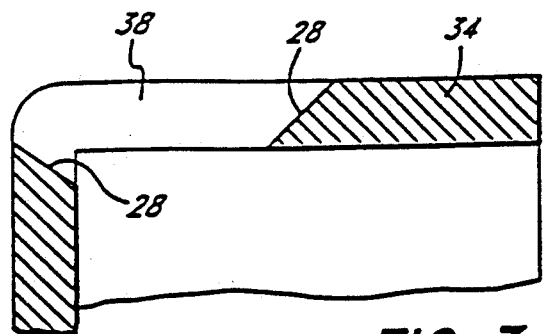
FIG. 3 is a partial cross-sectional view taken along line 3—3 of FIG. 2.

As illustrated in FIG. 2, the top opening 38 has generally a rectangular configuration defined by four edge surfaces 27, 28. Two of the edge surfaces 28, as best seen in FIG. 3, comprise chamfers, angling away from the defined opening 38. The opening 38 increase in area in an outward direction as a result of the chamfer configuration of the edge surfaces 28. As used herein, the "area" of an opening aperture, or orifice is measured across a plane of the opening, aperture or orifice perpendicular to the water flow. The bottom opening 39 has an identical configuration. This configuration increases water flow rate through the openings 38, 39; water flowing through the openings 38, 39 remains in a concentrated stream and does not diffuse at the outer edges of the openings 38, 39. As a result, the flow rate through the openings 38, 39 increases as water passes through the openings 38, 39.

The increased flow rate reduces scale formations which clog the openings 38, 39. Scale, in hard water, deposits on the edges 27, 28 of the openings 38, 39 and builds outwardly in a stalagmite fashion, away from the edge surfaces 27, 28. The increased flow, however, limits the growth of the scale deposit. The increased water current fractures the stalagmite structure extending into the center of the current. Thus, scale is less likely to bridge the openings 38, 39 and to reduce the flow of water through the purifier 10.

Figure 4:
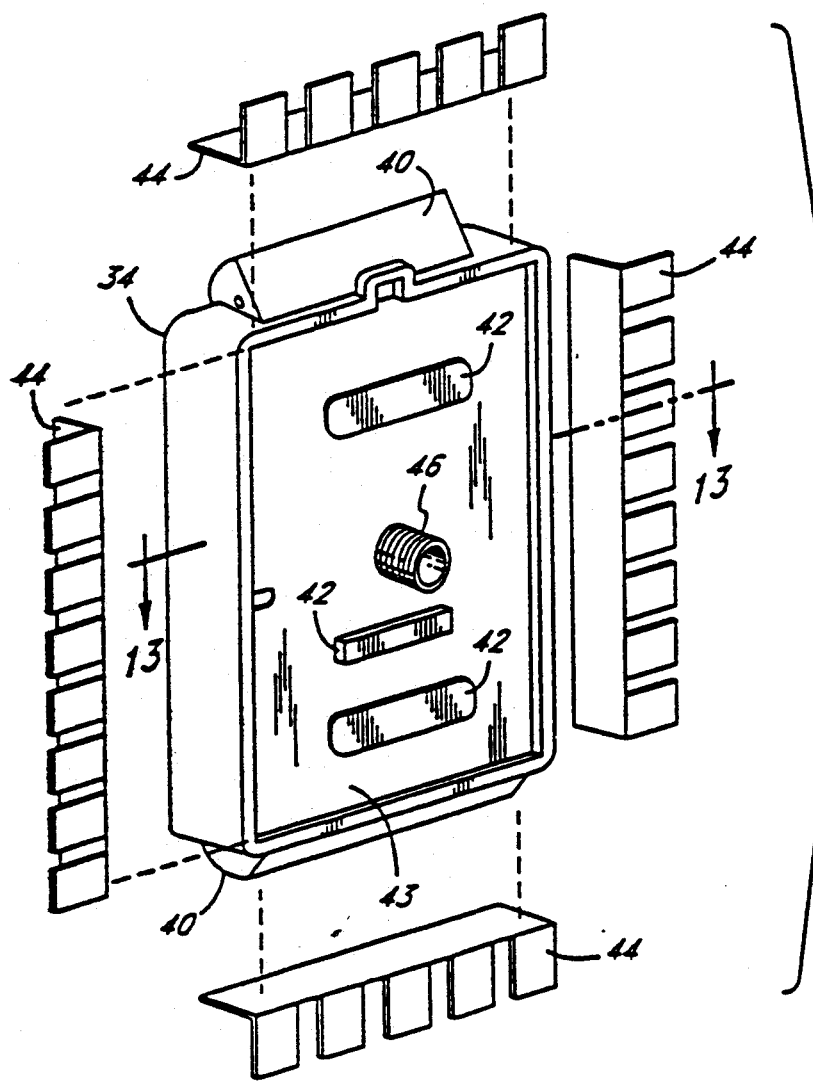
FIG. 4 is a partial rear perspective view of the purifier of FIG. 1, illustrated with wall spacers.
Figure 5:
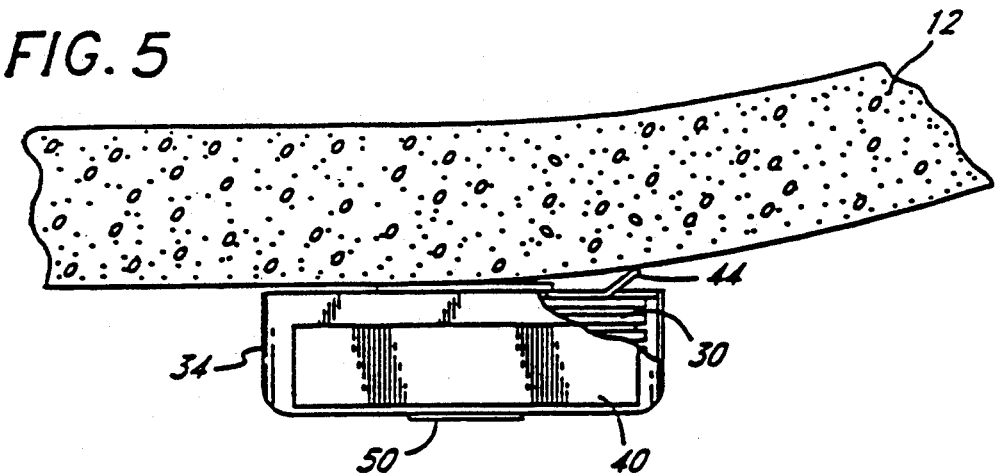
FIG. 5 is a plan view of the purifier of FIG. 1 mounted to a curved pool wall.

About each opening 38, 39, the enclosure includes a directional diffuser 40. The directional diffusers direct water flow exiting the openings 38, 39 towards the center of the pool 14. As illustrated in FIG. 2, each diffusers preferable includes a metal rod 41 extending longitudinally across the diffuser. The rods act as a grate or guard, preventing objects smaller than the openings 38, 39 from entering the openings Referring to FIG. 4, the enclosure 34 also includes two flange brackets 42 integrally mounted onto a back panel 43 of the enclosure 34. These brackets 42 receive several spacers 44 which wedge between the enclosure 34 and the pool wall 12 to blend with the contoured (or otherwise not flat) surface of the pool wall 12, as illustrated in FIG. 5. Although FIGS. 4 and 5 illustrate the purifier 10 as having four rectangular spacers 44, the proper combination and shape of the spacers 44 is dictated by the shape and contour of the pool wall 12.

Figure 6:
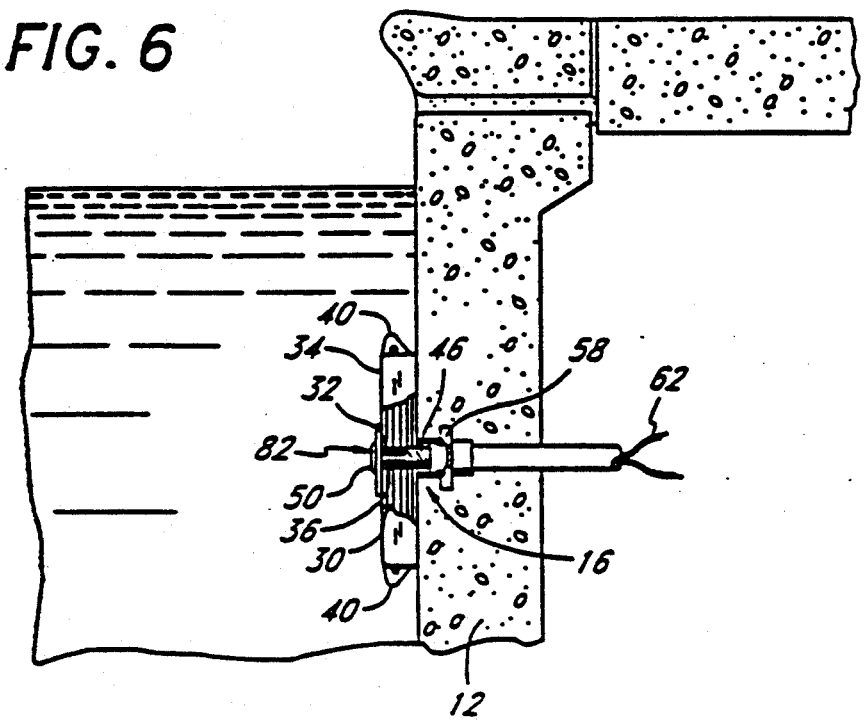
FIG. 6 is a partial cross-sectional view of the purifier of FIG. 1 attached to an existing pool fitting embedded in the pool wall.

Referring to FIG. 6, the attaching apparatus 16 secures the enclosures 34 to the pool wall 12. The attaching apparatus advantageously utilizes an existing fitting 58 of the water circulation line 18 located on the pool wall 12. Pools commonly include at least one exit port fitting 58 positioned in the pool wall 12 below the water line and in communication with the water circulating system. Employing the existing fitting 58 reduces the cost and time associated with installation of the purifier 10.

As illustrated in FIGS. 7 and 8, the fitting 58 conventionally includes an eyeball-shaped directional discharger 60 having a central aperture 59. The directional discharger 60 has a spherical shape with two symmetric sides truncating the spherical shape along vertical planes. As best seen in FIG. 8, a correspondingly shaped retainer ring 61 secures the directional discharger 60 within a socket 63 of the fitting 58 and thereby permits rotation of the discharger 60 in the fitting socket 63.

Referring to FIGS. 9 and 10, the attaching apparatus 16 comprises a similarly shaped directional discharger 64 having a thread hole 65 offset from the center of the directional discharger 64 and a wire passageway 68. The existing retainer ring 61 retains the modified directional discharger 64 within the existing socket 63, as illustrated in FIG. 10.

Figure 11:
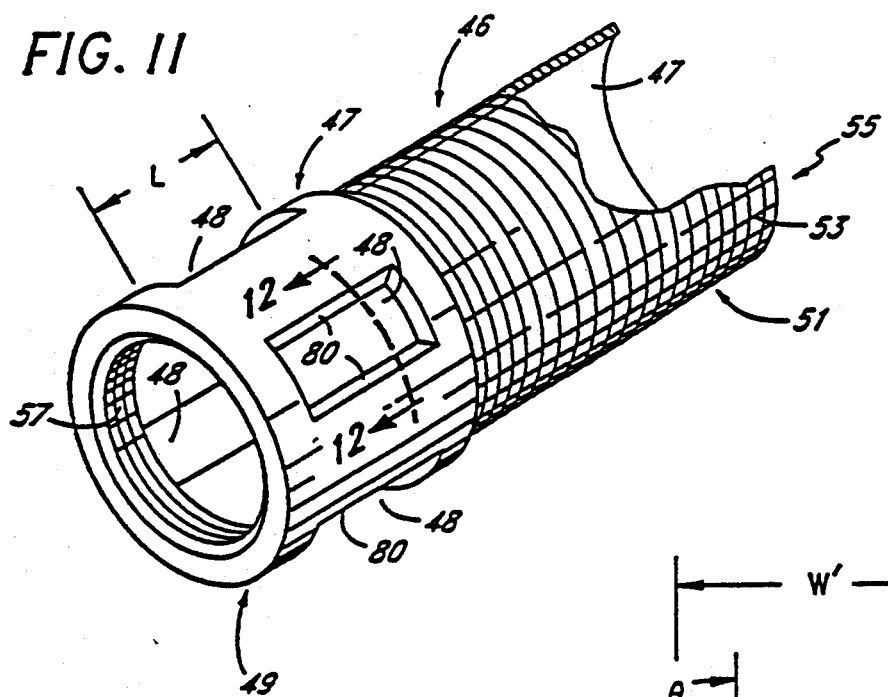
FIG. 11 is a perspective view of a nipple of FIG. 2.

As seen in FIGS. 2 and 6, the attaching apparatus 16 additionally comprises a nipple or nozzle 46. FIG. 11 illustrates the nipple 46 having a generally tubular shape body 45 with an internal flow passage 47. The nipple body 45 defines a plurality of equally spaced apertures 48 proximate to a cap end 49. Although FIG. 11 illustrates the nipple body 45 as defining four apertures, it is understood that any number of apertures 48 can be used as well. Proximate to the apertures 48, the nipple 46 includes internal threads 57 extending into the flow passage 47 from the cap end 49. The nipple 46 also includes a connector 51 having a threaded exterior 53 extending from an engagement end 55 which engages the threaded hole 65 of the directional discharger 64 in assembly.

Figure 12:
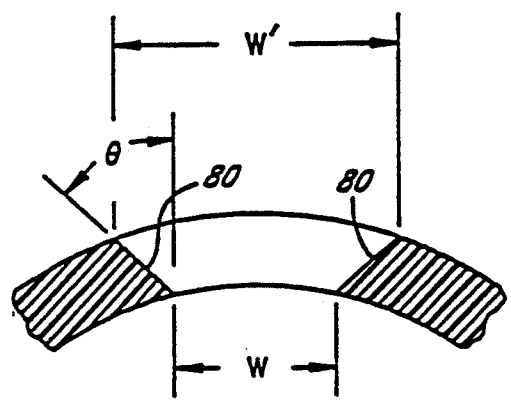
FIG. 12 is a partial cross-sectional view taken along line 12—12 of FIG. 11.

To prevent scale accumulation in the nipple apertures 48, the apertures 48 have a configuration increasing in area in the radial direction perpendicular to the water flow. As illustrated in FIG. 12, chamfered edges 80 define the apertures 48; the edges 80 angle outwardly from a radius of the tubular nipple 46 by an incline angle θ. Preferably, the incline angle θ ranges between 30° and 60°, and more preferably equals about 45°. As discussed above in connection with the enclosure openings 38, 39, this configuration increases flow rate through the apertures 48. The resulting water jet fractures scale formations extending from the chamfered edges 80.

Although FIG. 11 illustrates the apertures 48 as having a rectangular configuration, it is understood that other aperture configurations, such as, for example, oval or circular shapes, can be used as well. The particular aperture configuration must be sized to produce a sufficient flow rate to break off scale formation accumulating on the edges 80 of the apertures 48. The aperture size, however, should not be too small, as scale and other objects will easy clog the apertures 48.

For example, the rectangular apertures 48 illustrated in FIGS. 11 and 12 have lengths L in the longitudinal direction, widths W at the interior surface of the nipple body, and widths W' at the exterior surface of the nipple body. These dimensions are measured perpendicular to the water flow through the apertures 48. Preferably, the widths W of the apertures 48 ranges between about 1/16th inch and ⅛th inch, and more preferably equals about 3/16th inch for water flowing into the nipple 46 under 2-3 pounds per square inch of pressure.

Figure 13:
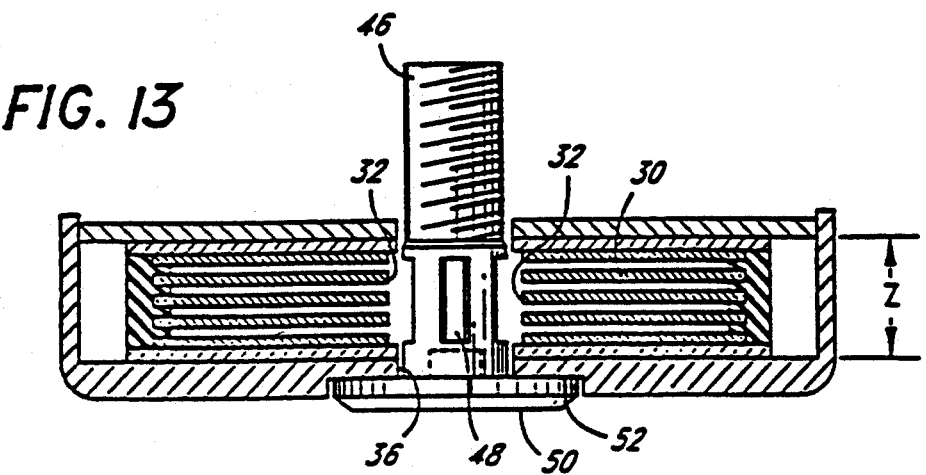
FIG. 13 is a cross-sectional view taken along line 13—13 of FIG. 4.

As illustrated in FIGS. 11 and 13, the longitudinal length L of the aperture chamfer edges 80 is equal to about the stacked width Z of the juxtaposed electrodes 20. As a result, water exiting the apertures 48 flows over the electrode surfaces.

Referring to FIGS. 2 and 6, the attaching apparatus 16 further includes a cap 82 comprising a flange disk 50 and a threaded shank 84 (FIG. 2). The threaded shank 84 is sized to engage the internal threads 57 of the nipple 46, without interfering with water flow through the nipple apertures 48. Although the FIGS. 2, 6 and 11 illustrate the cap 82 as including the externally threaded shank 84, it is contemplated that the cap could include internal threads, and the nipple cap end 49 could include external threads. Additionally, other type of connections, such as, for example, a male-female snap-type connector, can be used as well to removably connect together the cap 82 and cap end 49 of the nipple 46.

The flange disk 50 has a shape commensurate with that of the enclosure recess 26 and is larger in diameter than the enclosure aperture 36. In assembly, the flange disk 50 fits flush with the front panel 24 of the enclosure 34. The flange disk 50 defines two or more cavities 54 that mate with an installation tool. The tool is used to tighten the cap 82 onto the nipple 46, and is used in turn to tighten the nipple 46 into the directional discharger 64.

The attaching apparatus 16, especially the nipple 46, is preferably formed of a generally inert plastic, such as, for example, Teflon ® or a high molecular weight polyethylene. Scale does not adhere well to these types of plastics.

In assembly, the directional discharger 64 fits within the socket 63 of the existing fitting 58 with the retainer ring 61 securing the discharger 64 in place. The nipple 46 threads into the threaded discharger hole 65 and cantilevers away from the pool wall 12. The electrical wires 62 (FIG. 6), connected to the electrolytic cell 30, thread through the wire passageway 68. The enclosure 34 secures to the pool wall 12 by sliding over the nipple 46; the enclosure aperture 36 and electrode bore 32 receive the nipple 46. The cap 82 secures the enclosure 34 and electrolytic cell 30 in place by threading into the end cap 49 of the nipple 46. As assembled, the enclosure 34 abuts against the pool wall 12; however, if the pool wall is curved, edge spacers 44 are placed against the flange brackets 42 prior to tightening. The edge spacers 44 can be trimmed or contoured to the pool wall 12 configuration.

Assembled with the fitting socket 63, the nipple communicates with the water circulation line 18. Pressurized water flows inside the tubular nipple 46 and disperses through the apertures 46. As mentioned above, water exiting the apertures 46 flows over each electrode surface 20 and exits through the outlet openings 38, 39.

Figure 14:
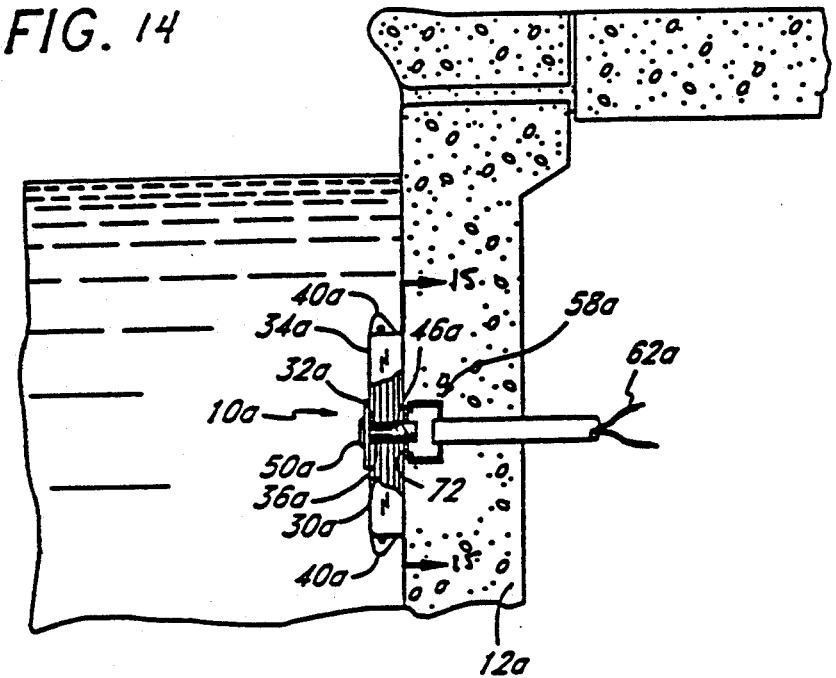
FIG. 14 is a cross section of a pool illustrating a purifier in accordance with a second embodiment of the present invention attachment to a discharge wall fitting.
Figure 15:
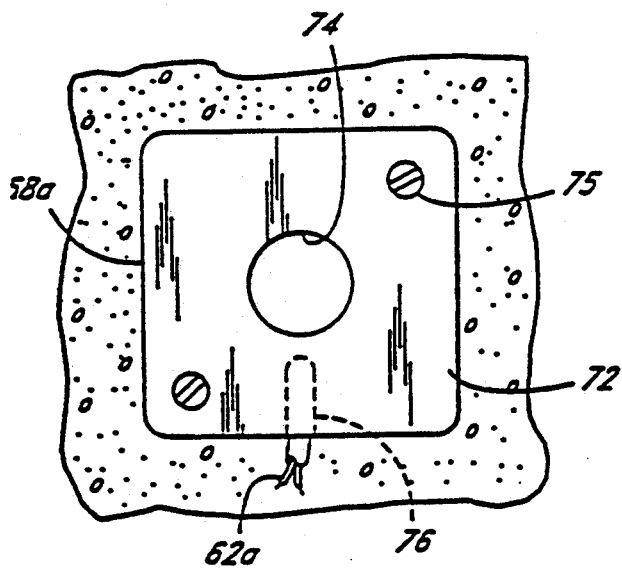
FIG. 15 is a cross-sectional view taken along lines 1513 15 of FIG. 14, illustrating an attaching plate in accordance with the purifier of FIG. 14 attached to the wall fitting.
Figure 16:
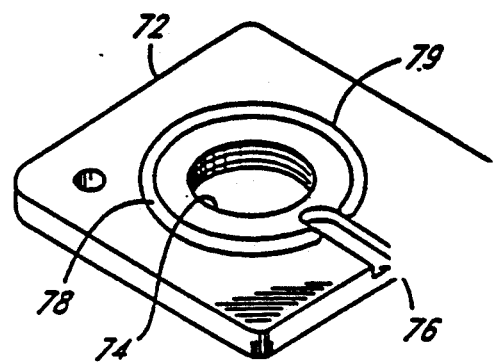
FIG. 16 is a rear perspective view of the wall plate shown removed from the purifier for clarity.

FIGS. 14 through 16 illustrate another embodiment of the attaching apparatus 16 for use with another type of pool fitting 58. Where appropriate, like numbers with an "a" suffix are used to indicate like parts of the two embodiments for ease of understanding. Instead of a directional type fitting 58, as previously described, the fitting, as shown in FIG. 14, comprises a wall fitting 58a surrounding an end of the water circulation line 18. If the wall fitting 58a contains a grill or diffuser, it is removed and not used. As depicted in FIGS. 14 and 15, a plate 72 attaches over the fitting 58a in place of a grill.

Referring to FIG. 15, the plate 72 is constructed of thermoplastic and defines a threaded centrally located hole 74 and an offset wire receiving slot 76 near the hole. An 0-ring 78, as seen in FIG. 16, fits into a groove 79 and partially encircles the hole 74, terminating at the slot 76. As shown in FIG. 15, the slot 76 permits the wires 62 to extend from the wall fitting 70 towards the purifier 10

The installation of the purifier 10 is identical to the procedure described above, except that fasteners 75 (FIG. 15), such as, for example, screws, securely fasten the plate 74 to the pool wall 12. The nipple 46 is threaded into the hole 74 and the enclosure abuts against the plate, compressing the 0-ring 78 between the plate 74 and the pool wall 12.

The plate 74 can also be used where the circulation line 18 extends to the surface of the pool wall 12. That is, the pool does not include the wall fitting 58a. The plate mounts directly to the pool wall, aligning with and covering over the end of the water circulation line 18. The attaching apparatus 16 and enclosure attach to the plate 74, as described above.

The purifier 10, as defined, provides superior descaling characteristics. In hard water, scale deposits on the edges 80 of the nipple apertures 48 and on the edges 28 of the enclosure openings 38, 39. The diverging orifice configuration of the apertures 48 and the openings 38, 39 produces an increased flow rate through these orifices, as discussed in detail above. The increase flow rate prevents massive scale growth across the openings 38, 39 and the apertures 48. The purifier 10 additionally exhibits greater descaling qualities if used with a power supply reversing the polarity of electricity supplied to the electrodes 20, as described in U.S. Pat. No. 4,992,156. These descaling features extends the life of the purifier 10.

The purifier 10 is also easily retrofitted to a pool 14 by using the existing circulation line fitting 58. The installation, as described above, is simple and cost efficient. Through a few simple installation steps, the nipple 46 couples with the circulation line 18 and extends outwardly from the pool wall 12. The enclosure 34 slips over the nipple 46 and the cap 82 secures the enclosure 34 onto the nipple 46. Installation does not require aligning the enclosure aperture 36 with the threaded hole 65 of the directional discharger 64. Nor does the installation of the purifier 10 require simultaneously coupling the enclosure 34 and the nipple 46 with the directional discharger 64. Thus, installation is usually completed from the pool deck reaching into the pool 14.

In assembly, the enclosure 34 fits flat against the pool wall 12 or smoothly blends with the contoured pool wall 12. This unobtrusive position prevents interference with pool sweeping equipment. The low profile of the purifier 10 as installed also reduces the possibility of interfering with swimmers and is generally inconspicuous—particularly with no wires 62 visible from the outside.

Figure 17:
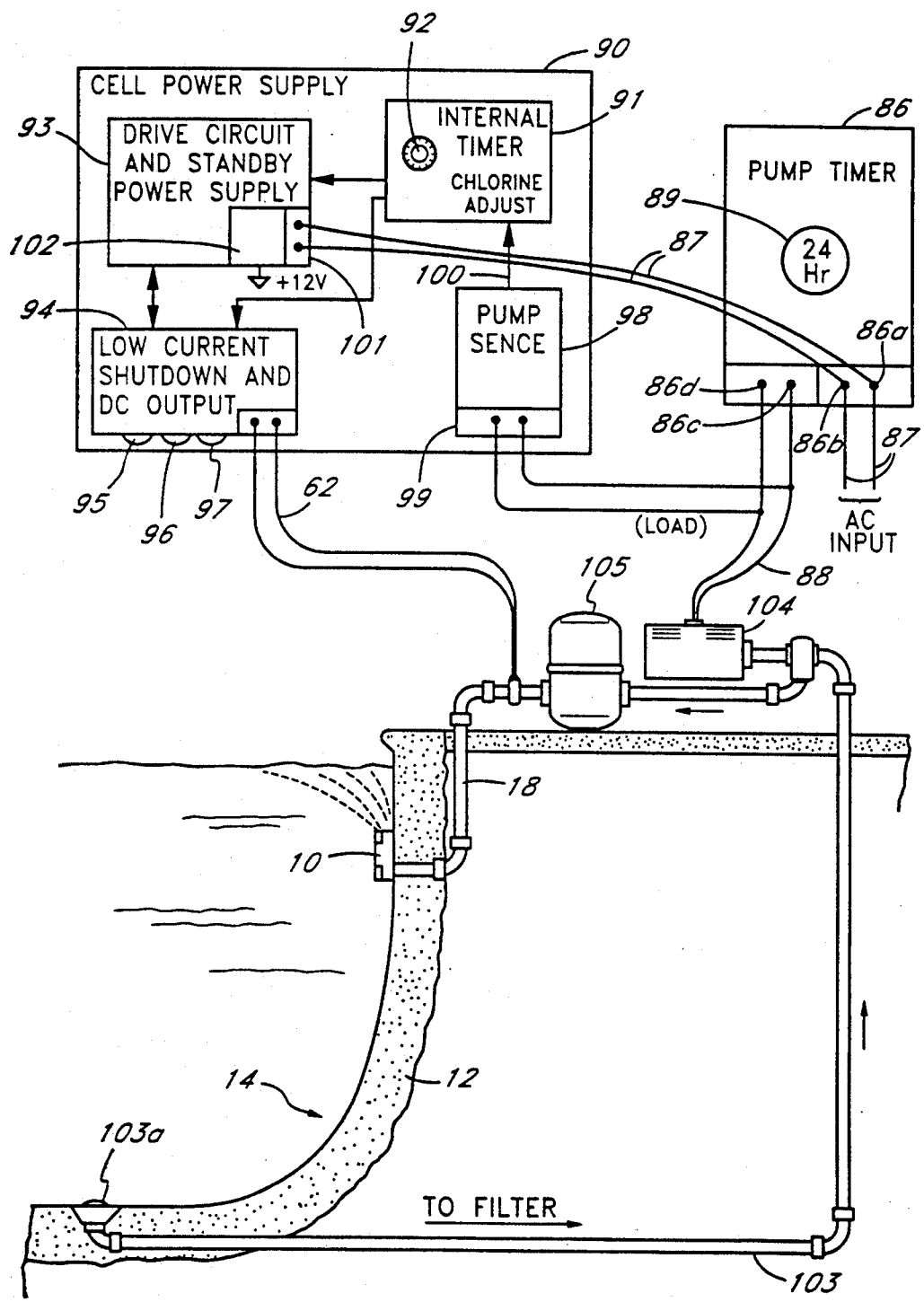
FIG. 17 is a block diagram of a pool circulation system including an electrolytic pool purification system, according to one embodiment of the present invention.

FIG. 17 illustrates a pool circulation system including an electrolytic pool purifier of the present invention. The electrolytic cell 10 of the present invention is attached to the wall 12 of the swimming pool 14. A water inlet 103a connects to a water circulation line 103 into which the pool water is drawn by a motor, or pool pump 104. The pool water is forced, by the pump 104, through a pool filter 105 and is then returned to the pool through the water circulation line 18. The cell 10, attached to the exit port of water circulation line 18, purifies the pool water as previously discussed.

The present invention also includes an electrical circuit to control the water circulation system just described. Control of the pool pump 104 and the electrolytic cell 10 is accomplished by an electrical circuit including a pump timer 86 and a cell power supply, or control circuit 90. The pump timer 86, which is well known in pool technology, has input terminals 86a,b which connect to 120 or 240 VAC input lines 87. The pump timer 86 also has a pair of output terminals 86c,d which provide power to the pool pump 104 via a pair of wires 88. The pump timer 86 has a 24-hour- dial 89 to set the start and end time for the pool pump 104. For example, a 6 hour cycle can be set to begin at 5:00 am and end at 11:00 am.

The cell power supply 90 drives the cell 10 across the wires 62 and controls the cell cycle time. The cell power supply 90 includes several sections of circuitry. The sections include an internal timer 91, a drive circuit and standby power supply 93, a low current shutdown and DC output circuit 94 and a pump sense circuit 98. The AC input lines 87 pass through the pump timer 86 and connect to an input terminal block 101 in the drive circuit and standby power supply 93 to provide AC line power for the cell power supply 90. The pool pump power wires 88 connect to an input terminal block 99 of the pump sense circuit 98.

Now describing internal connections, the output of the pump sense circuit 98 connects to the internal timer 91 via a line 100. The internal timer 91 has a dial 92 with settings 1-10 to adjust the level of chlorination. The internal timer 91 is connected to the drive circuit and standby power supply 93 and to the low current shutdown and DC output circuit 94. The drive circuit includes a source of +12 volt power 102 for the cell power supply 90. The drive circuit and standby power supply 93 connects to the low current shutdown and DC output circuit 94 which contains three light emitting diodes (LEDs) 95, 96, and 97. The first LED 95 indicates 'Check Cell' which denotes a fault condition in the cell 10. The second LED 96 indicates 'Cell On' which means power is being supplied to the cell 10. The third LED 97 indicates 'AC On' which means the drive circuit and standby power supply 93 has power and is supplying +12 volts 102. Thus, LEDs 96,97 are lighted during the normal operation of the control circuit 90. The output of the low current shutdown and DC output circuit 94 drives the lines 62 connected to the cell 10.

As an example, if the electrolytic cell 10 is set to operate 6 hours per day, the chlorine adjust dial 92 is set to 2.5, or 25%, and the 24-hour timer 89 for the pool pump 104 is set to three representative conditions, the cell 10 will operate as follows:

| Pump | Cell |
|------|------|
| 2 hours | 2 hours with pump, 4 hours without |
| 6 hours | 6 hours with pump |
| 12 hours | 6 hours with pump. |

Figure 18:
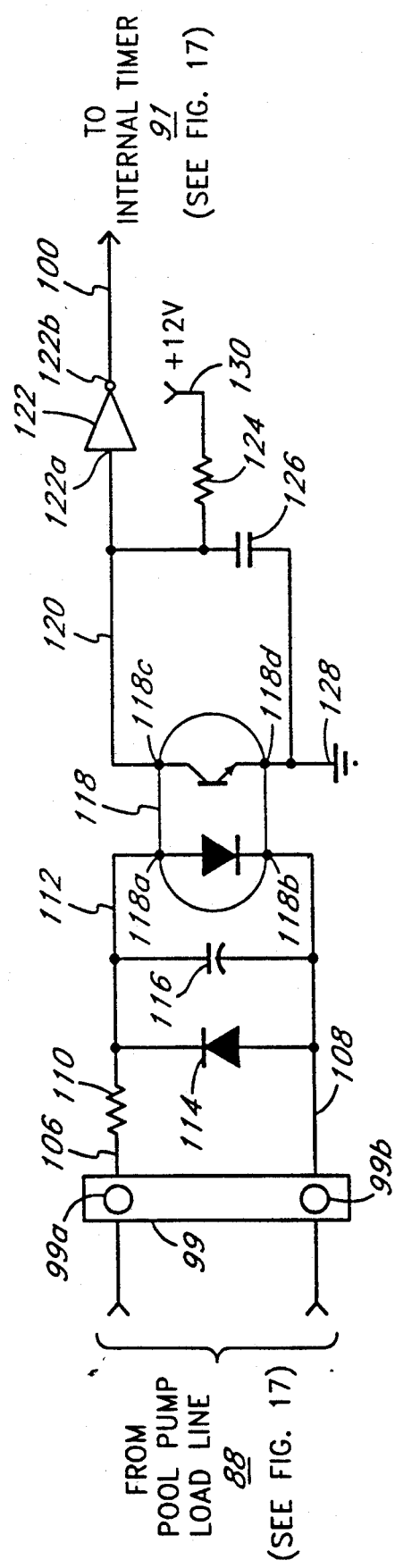
FIG. 18 is a schematic of a presently preferred embodiment of the pump sense circuit of FIG. 17.

FIG. 18 schematically illustrates the preferred embodiment of the pump sense circuit 98 referred to in FIG. 17. The pump sense circuit 98 generally functions by using a sensing device, e.g., an optocoupler, to sense the voltage on the pump motor wires 88 and based thereon initiate power flow to the electrolytic cell 10. An optocoupler 118 is used to isolate the high voltage at the pump terminals from the low voltage devices of the remainder of the circuit.

In FIG. 18, two lines 106,108 are connected in parallel with a pair of pump terminals whether or not the input voltage is 120 VAC or 240 VAC. The line 106 is connected to a terminal 99a of a pump terminal block 99 and the line 108 is connected to a terminal 99b. In a 240 VAC application, the two line system will always be in phase.

In the presently preferred embodiment, a 68 kOhm, 2 watt resistor 110 is connected between the line 106 and a line 112. A diode 114 is connected across the lines 108,112. A 0.1 μF capacitor 116 is connected across the lines 108,112 in parallel with the diode 114.

The optocoupler 118, preferably part number 4N35 from Texas Instruments, has four terminals 118a,b,c,d, two of which receive pool pump power via the lines 108,112, namely, terminal 118a of the optocoupler is connected to line 112 and terminal 118b is connected to line 108. Terminal 118c of the optocoupler 118 is connected to a signal line 120 which connects to an input terminal 122a of a Schmitt Trigger 122, preferably part number 40106. A 1 MOhm resistor 124 and a 0.1 μF capacitor 126 are also connected to the signal line 120. Terminal 118d of the optocoupler 118 and the capacitor 126 are connected to a ground 128. The resistor 124 is also connected to a +12 volt power supply 130. Output terminal 122b of the Schmitt Trigger 122 is connected to a signal line 100 which then connects to the internal timer 91.

The pump sense circuit 98 operates as follows. Voltage (120/240 VAC) across the pump motor lines 88 (FIG. 17) is received at the pump terminal block 99. This voltage is dropped through the resistor 110, half-wave rectified by the diode 114 and the noise is filtered by the decoupling capacitor 116. The result is a small 60 Hertz pulse fed to the optocoupler 118 at terminal 118a. A light emitting diode (LED) half of the optocoupler 118 will then trigger a phototransistor half. The output at terminal 118c of the optocoupler will be inverted. This signal is then decoupled by the capacitor 126 and inverted again by the Schmitt Trigger 122. The decoupling capacitor 126 and the Schmitt Trigger 122 serve to filter the signal of high frequency noise. The signal at line 100 is thus fed to the internal timer 91 to start the on-time control circuit.

Figure 19A:
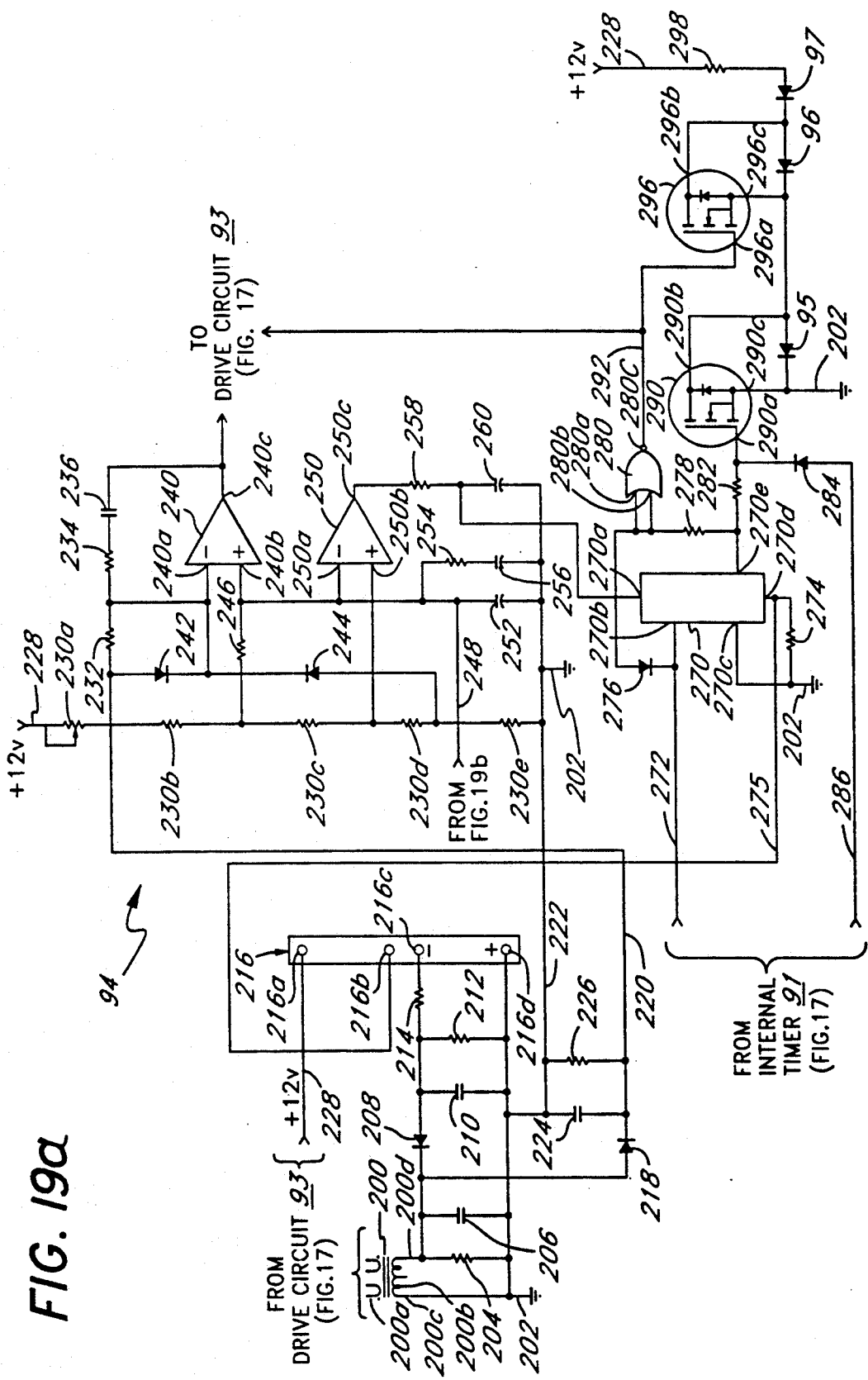
FIG. 19a, b is a schematic of a presently preferred embodiment of the low current shutdown and direct current (DC) output circuit of FIG. 17.

FIG. 19a,b schematically illustrate a preferred embodiment of the low current shutdown and DC output circuit 94 referred to in FIG. 17. The low current shutdown and DC output circuit 94 generally functions by sensing the load current in the wires 62 leading to the electrolytic cell 10 via a device such as a current transformer. The low current shutdown and DC output circuit 94 protects the cell 10 from further damage by shutting down the system if the current drops below a level of 3.8 amps, where the nominal current is 5 amps. Any fault that occurs in the cell 10 will cause the resistance to increase. Since the power supply is voltage limited, the current will begin to fall when a fault condition, such as scaling, electrode failure, wire short circuit or low salt level, is encountered. A fault will quickly cause a drop in current which is indicative of a fault condition. There are generally 4 portions of circuit 94: monitor, shutdown, indicator, and DC output.

In FIG. 19a, the monitor portion of circuit 94 includes a current transformer 200 having a primary winding 200a, which connects to the drive circuit and standby power supply 93 of FIG. 17, and a secondary winding 200b. The secondary winding 200b has a terminal 200c, which connects to a ground 202, and a terminal 200d. Connected in series between terminal 200d and a terminal 216c of a terminal block 216 are a diode 208 and a 1 kohm resistor 214. Connected in parallel between the terminal 200d and the ground 202 are a 220 ohm resistor 204, a 0.001 μF capacitor 206, a 0.1 μF capacitor 210, and a 1 Mohm resistor 212. Connected between the secondary winding terminal 200d and a wire 220 is a diode 218. A ground wire 222 connects to the ground 202. A 0.1 μF capacitor 224 and a 1 Mohm resistor 226 connect in parallel between the wire 220 and the ground wire 220. The ground 202 is connected to a terminal 216d of the terminal block 216. Connected to terminal 216a of the terminal block 216 is a +12 volt power source 228 from the drive circuit and standby power supply 93 (FIG. 17).

The lines 220, 222 connect the monitor portion of the circuit 94 with the shutdown portion. The shutdown portion includes a voltage divider network 230 having a 5 kohm potentiometer 230a, a 5.1 kohm resistor 230b, a 1 kohm resistor 230c, a 1 kohm resistor 230d and a 2.4 kohm resistor 230e connects between the +12 volt power 228 and the ground line 222. A series connection exists on the wire 220 for a 100 kohm resistor 232, a 10 kohm resistor 234 and a 0.1 μF capacitor 236 between the diode 218 and the output terminal 240c of an op-amp 240. The op-amp output 240c connects to the drive circuit and standby power supply 93 (FIG. 17). A diode 242 is connected between the wire 220 and an input terminal 240a of the op-amp 240. A diode 244 is also connected between the input terminal 240a and into the voltage divider network between the resistors 230d,e. A 100 kohm resistor 246 connects between an input terminal 240b of the op-amp 240 and into the voltage divider network between the resistors 230b,c.

An input line 248 from the DC output portion of circuit 94 (FIG. 19b) is connected to the input terminal 240b of the op-amp 240, an input terminal 250a of an op-amp 250, a 0.001 μF capacitor 252 tied to the ground line 222 and a 10 kohm resistor 254 in series with a 1.0 μF capacitor 256 tied to the ground line 222. An input terminal 250b of the op-amp 250 connects into the voltage divider network between the resistors 230c,d. An output terminal 250c of the op-amp 250 connects to 1

Mohm resistor 258 in series with a 1.0 μF capacitor 260 tied to the ground line 222.

The control circuit 94 also includes an indicator portion. A flip flop 270 has a SET input terminal 270a connected to the op-amp 250 output at a point in between the resistor 258 and the capacitor 260. A line 272 from the internal timer 91 (FIG. 17) connects to a CLOCK input terminal 270b of the flip flop 270. A data input terminal 270c is tied to the ground 202. A RESET input terminal 270d of the flip flop 270 is tied to ground through a 10 kohm resistor 274. Also connected to the RESET input terminal 270d is a line 275 further connected to a terminal 216b of the terminal block 216. The purpose of line 275 will be discussed below. A diode 276 is connected from the line 272 to a pair of input terminals 280a,b of a NOR gate 280 and to a 100 kohm resistor 278. The resistor 278 is further connected to an output terminal 270e of the flip flop 270 and to a 100 kohm resistor 282.

The indicator portion of the control circuit 94 also includes the LEDs 95,96,97 shown in FIG. 17. A diode 284 connects between an input line 286 from the internal timer 91 (FIG. 17) and to the resistor 282 and a gate terminal 290a of a transistor 290. A source terminal 290c of the transistor 290 and the cathode of the LED 95 connect to the ground 202. A drain terminal 290b of the transistor 290 connects to the anode of the LED 95, to the cathode of LED 96 and to a source terminal 296c of a transistor 296. An output 280c of the NOR gate 280 connects to a wire 292 which connects to the drive circuit and standby power supply 93 (FIG. 17) and to a gate terminal 296a of the transistor 296. A drain terminal 296b of the transistor 296 connects to the anode of the LED 96 and to the cathode of the LED 97. The +12 volt power source 228 connects to the anode of the LED 97 across a 1 kohm resistor 298.

Figure 19B:
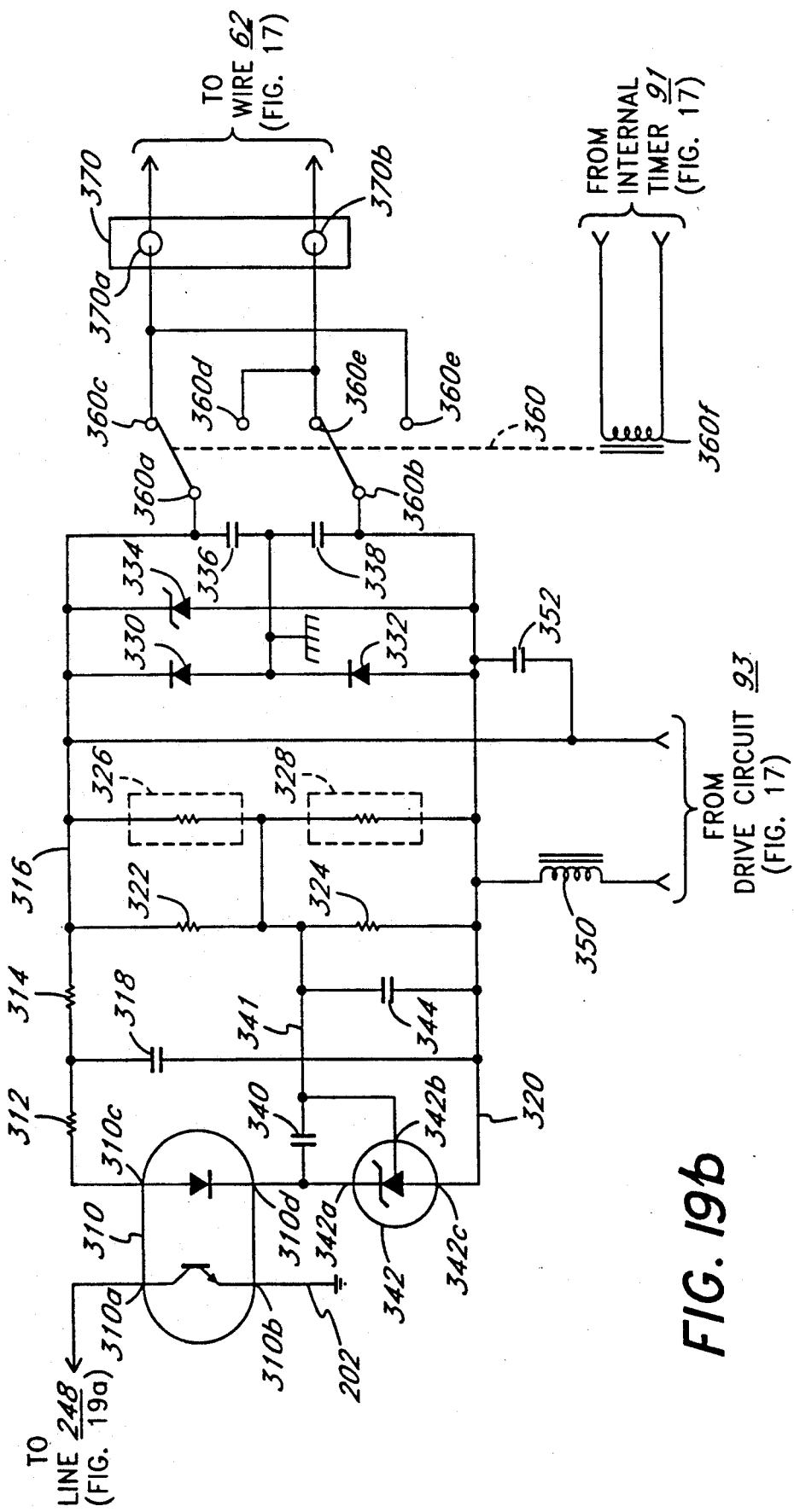

FIG. 19b schematically illustrates the DC output portion of the control circuit 94. A terminal 310a of an optocoupler 310 connects to the line 248 (FIG. 19a). Terminal 310b is tied to ground 202. Terminal 310c connects to a 1 kohm resistor 312 in series with a 1 kohm resistor 314 in series with a line 316. A 100 μF capacitor 318 connects between the line 316 and a line 320. In parallel with the capacitor 318 is a 68.1 kohm resistor 322 in series with a 10 kohm resistor 324 which also is in parallel with a resistor 326 in series with a resistor 328. Also in parallel with the capacitor 318 is a diode 330 in series with a diode 332 which also is in parallel with a Zener Transorb 334 which again is in parallel with a 0.1 μF capacitor 336 in series with a 0.1 μF capacitor 338. A 0.1 μF capacitor 340 connects between a terminal 310d of the optocoupler 310 and a line 341 which further connects to a point between the resistor 322 and the resistor 324. A terminal 342a of a semiconductor-controlled rectifier (SCR) 342 connects to the terminal 310d of the optocoupler 310, a terminal 342b connects to the line 341 and a terminal 342c connects to the line 320. A 0.001 μF capacitor 344 connects between the line 341 and the line 320.

An input from the drive circuit and standby power supply 93 (FIG. 17) connects to an output choke 350 which further connects to the line 320. Another input from the drive circuit and standby power supply 93 (FIG. 17) connects to the line 316 and to a 330 μF capacitor 352 which further connects to the line 320. A relay 360 has a terminal 360a connected to the line 316, a terminal 360b connected to the line 320, a terminal 360c connected to a terminal 360e and to a terminal 370a of a terminal block 370, and a terminal 360d connected to a terminal 360e and to a terminal 370b of the terminal block 370. The relay 360 has a winding 360f which receives inputs from the internal timer 91 (FIG. 17). The terminals 370a,b connect to the wires 62 which lead to the electrolytic cell 10 (FIG. 17).

The low current shutdown and DC output circuit 94 operates as follows. The monitor portion includes the transformer 200 for providing a means to indirectly measure current by measuring a proportional voltage across terminals 216c, 216d. AC voltage is transferred from the drive circuit and standby power supply 93 (FIG. 17) to the secondary winding 200b of the transformer 200, loaded by the resistor 204 and rectified by the diode 208. High frequency noise is decoupled by the capacitor 210. The resistor 212 acts as a direct current (DC) bleeder resistor when the current monitor test terminals 216c,d, normally at 5 volts DC, are not loaded with a voltmeter. The terminals 216a,b,c,d will be further discussed below. In an alternate embodiment, an inline series resistor can be used in place of the transformer 200 for measuring current to the electrolytic cell 10 (FIG. 17).

The network including the diode 218, the capacitor 224 and the resistor 226 serves the same purpose as the network including the diode 208, the capacitor 210 and the resistor 212 as discussed above and produces 5 volts DC on the line 220. However, this network provides the inverted portion of the AC signal. As the output load resistance of the cell power supply 90 (FIG. 17) increases due to a fault condition, the current and voltage at the primary winding 200a of the transformer 200 decrease proportionately which results in a DC voltage decrease on the line 220.

A decrease of the DC voltage on the line 220 also decreases the voltage at terminal 250a of the differential amplifier op-amp 250. When the voltage at the terminal 250a equals the reference voltage at the terminal 250b SET by the voltage divider network 230 the output terminal 250c goes to a logic high and causes the SET input 270a of the flip flop 270 to go high. This condition causes the output terminal 270e to go to a logic low and drives clock input terminal 270b to a logic low keeping the flip flop 270 at a disabled state. The low at output terminal 270e drives input terminals 280a,b of the NOR gate 280 low causing a logic high at the output terminal 280c. The logic high on the line 292 sent to the drive circuit and standby power supply 93 (FIG. 17) causes a shutdown of the power supply to the electrolytic cell 10. The logic high on the line 292 also causes the LED 96 (indicating "Cell On") to turn off by bypassing current through the transistor 296. The logic low at output terminal 270e causes the LED 95 (indicating "Check Cell") to turn on by turning off the transistor 290. The line 286 from the internal timer 91 (FIG. 17) carries a one second pulse which causes the LED 95 to flash.

The LED 95 (indicating "Check Cell") flashes until the fault condition causing the problem is corrected or an override is utilized. During field service, a technician removes an inspection cover (not shown) over the cell power supply 90 (FIG. 17) and connects a four pin female connector to the terminal block 216 which causes the terminals 216a,b ("Check Cell Inhibit") to be shorted. This short between the terminals 216a,b causes a +12 volt signal via line 275 to force the RESET input terminal 270d of flip flop 270 to go to a logic high which further causes the output terminal 270e to go to logic high. The logic high at the output terminal 270e causes the LED 96 ("Cell On") to turn on through the NOR gate 280 and the transistor 296 and also causes the LED 95 ("Check Cell") to turn off through the transistor 290. The technician can then determine a cause for the fault. Attaching a voltmeter to the other two terminals 216c,d of the terminal block allows a direct reading of volts to amps without conversion. For example, a reading of 5 volts across terminals 216c,d indicates a current of 5 amps across the primary winding of the transformer 200.

The circuitry illustrated in FIG. 19b is the DC output portion of the circuit 94. The SCR 342 functions as a voltage regulator. The resistors 322, 324, 326 and 328 define a threshold of 2.5 volts for the SCR 342. The SCR 342 will conduct at and above 2.5 volts triggering the optocoupler 310 so that terminal 310a will be connected to ground 202. The voltage at terminal 310a feeds back to the differential amplifiers 240 and 250 of the shutdown portion of the circuit 94 so as to facilitate voltage regulation. The capacitor 318 filters the noise across the optocoupler 310. The choke 350 reduces the noise on the input coming from the drive circuit 93 (FIG. 17). The diodes 330, 332 provide a path to ground if there would be a surge of voltage in the circuit. The Zener Transorb 334 provides over-voltage protection starting at 20 volts. Inputs from the internal timer 91 to the relay winding 360f will cause the relay to change state every 24 hour period which reverses the polarity of the nominal 19 volt, 5 amp signal at the terminals 370a,b.

FIG. 20 illustrates a preferred embodiment of the cell power supply 90 referred to in FIG. 17. As shown in FIG. 17, the cell power supply 90 includes four sections of circuitry. The sections are the pump sense circuit 98 which was described in detail with reference to FIG. 18, the internal timer 91, the drive circuit and standby power supply 93 and the low current shutdown and DC output circuit 94 which was described in detail with reference to FIG. 19

Figure 20A:
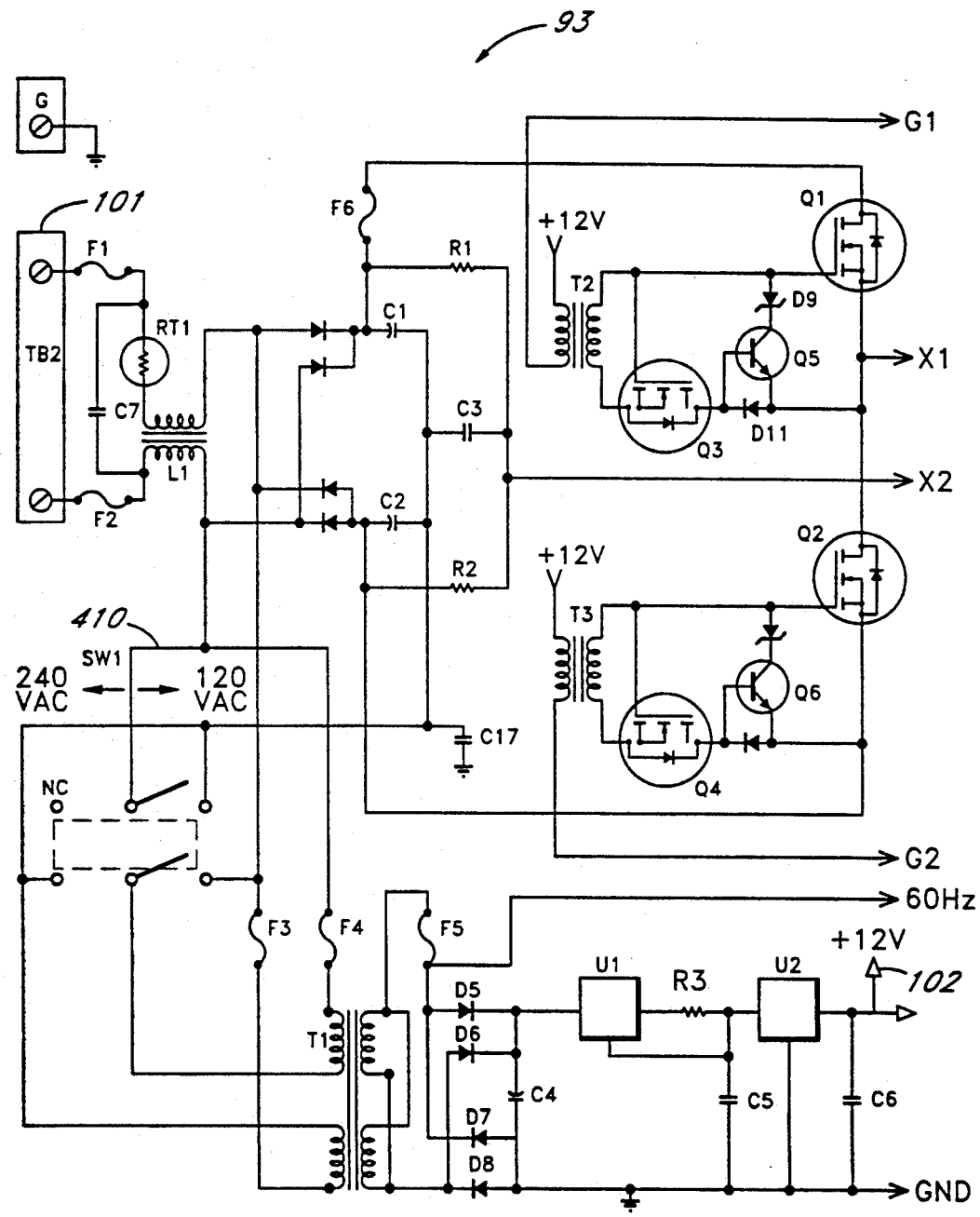
FIG. 20a,b,c,d,e is a schematic of a presently preferred embodiment of the cell power supply of FIG. 17.
Figure 20B:
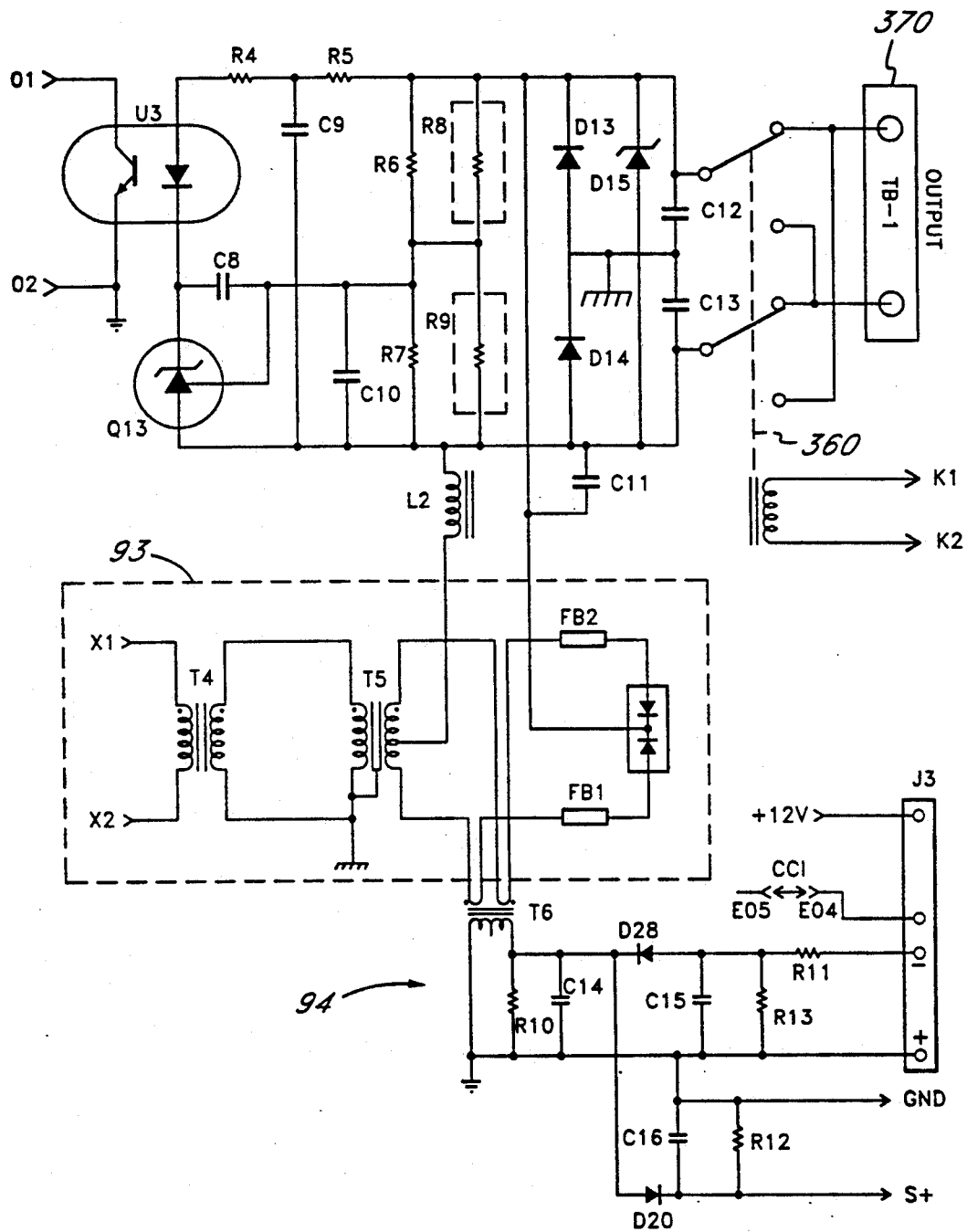
Figure 20C:
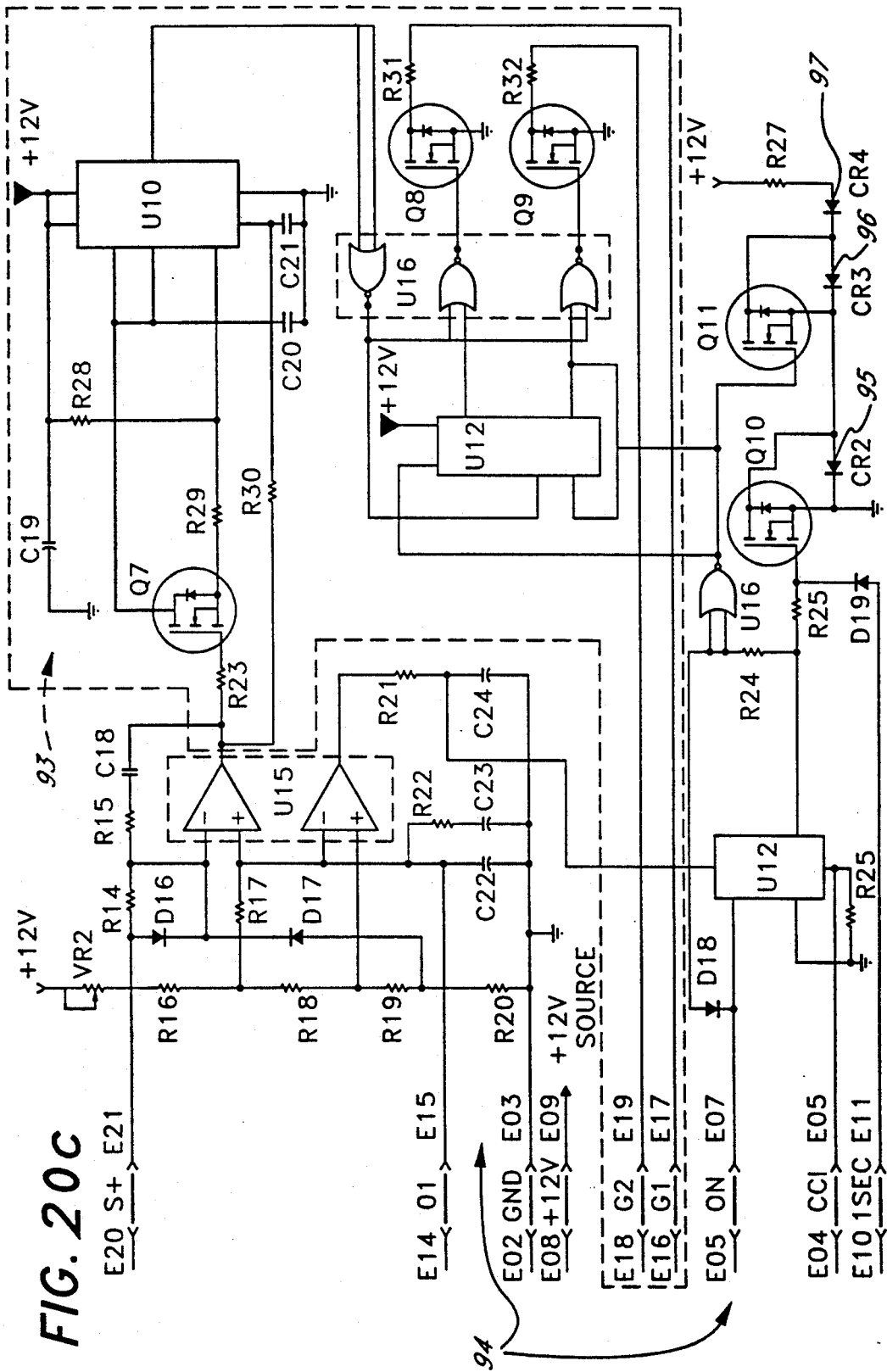

The drive circuit and standby power supply 93 includes the circuitry shown in FIG. 20a, part of the circuitry shown in FIG. 20b and part of the circuitry shown in FIG. 20c. The AC input terminal block 101 (FIG. 17) is shown on FIG. 20a. A switch 410 on FIG. 20a sets the drive circuit to accept either 120 or 240 VAC. The majority of the drive circuit and standby power supply 93 illustrated in FIG. 20a and part of FIG. 20b is a switching power supply circuit. An interface between the switcher power supply and the low current shutdown and DC output circuit 94 is included in FIG. 20c.

The low current shutdown and DC output circuit 94 includes part of the circuitry of FIG. 20b and part of the circuitry of FIG. 20c. FIG. 20b shows a relay 360 driving a terminal block 370 to which the wires 62 (FIG. 17) connect to the cell 10. The polarity on the relay 360 reverses every 24 hours to mitigate scaling in the cell 10 (FIG. 17) caused by hard water conditions.

Figure 20D:
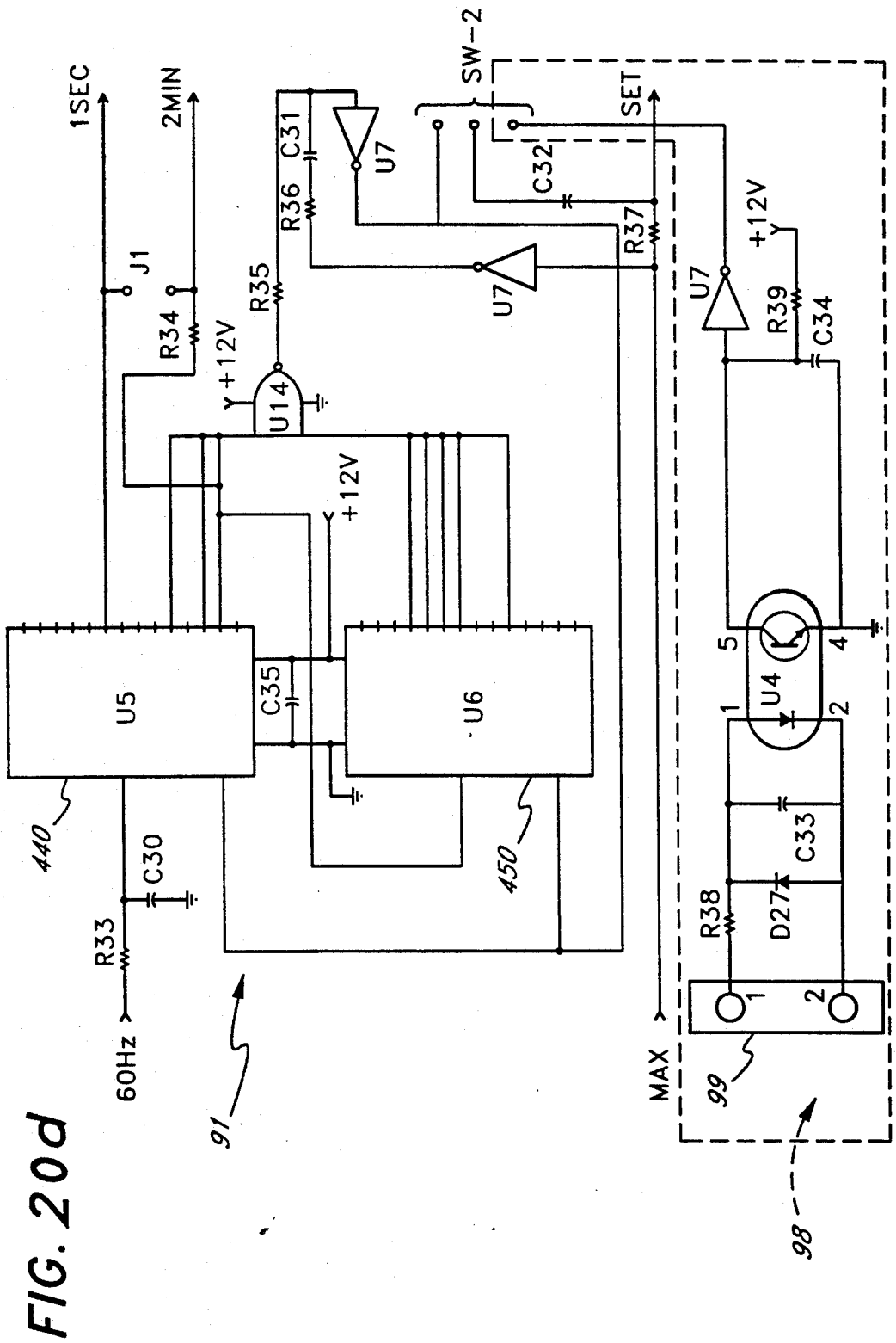
Figure 20E:
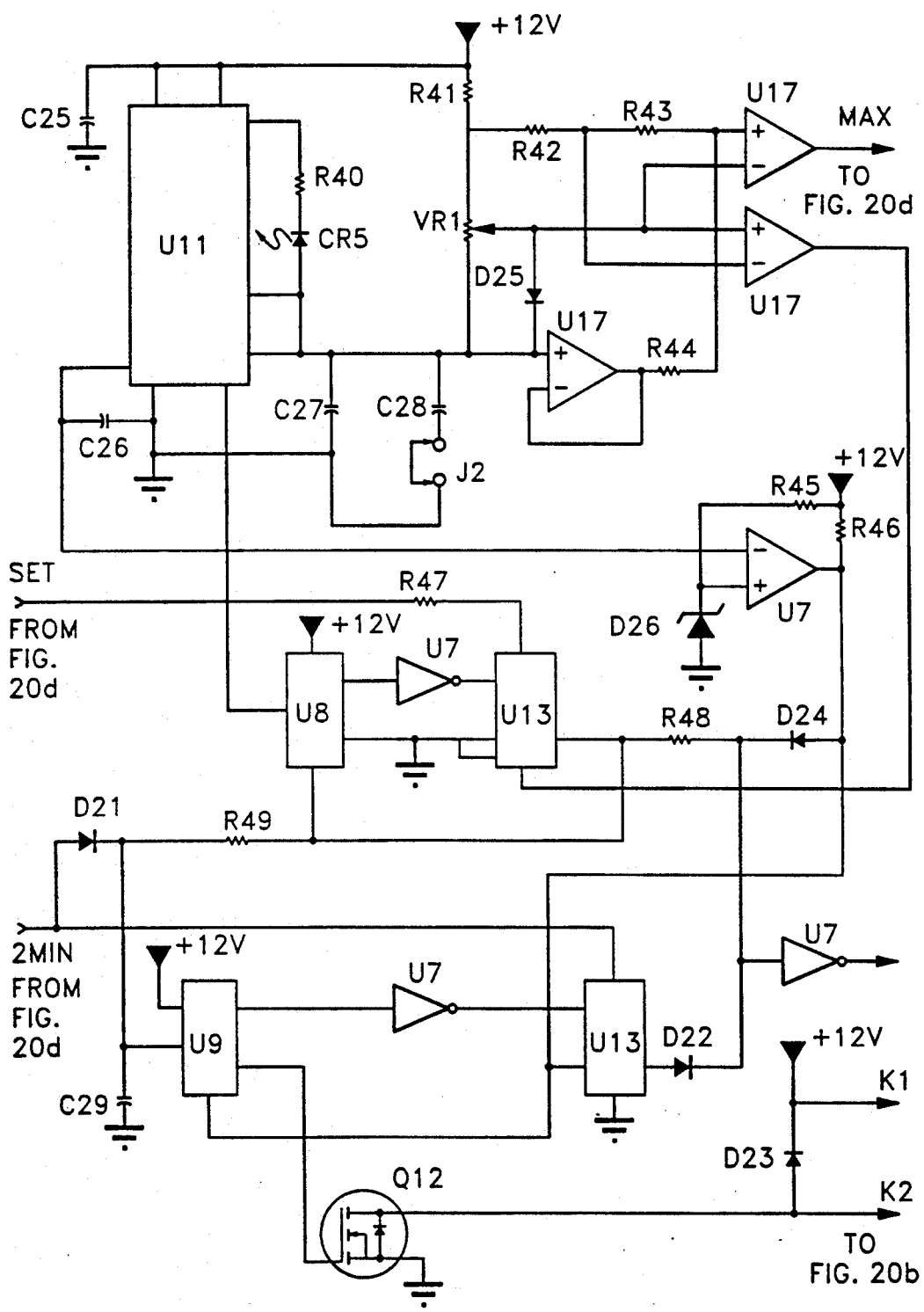

The internal timer 91 includes a majority of the circuitry on FIG. 20d and all the circuitry on FIG. 20e. A 24 hour timer is implemented by a first binary counter 440 and a second binary counter 450. An alternate embodiment of the timer can be accomplished by use of 555 timing circuits. The chlorine adjust dial 92 is shown on FIG. 20e.

The pump sense circuit 98 is shown at the bottom of FIG. 20d. The terminal block 99 connects to the pool pump power wires 88.

Table 1 lists the preferred values of devices in the embodiment of the cell power supply 90 illustrated in FIG. 20. The left column of the table is the part identifier shown in FIG. 20 and the right column describes the part type and value.

Although the invention has been described with reference to specific embodiments, the description is intended to be illustrative of the invention and is not intended to be limiting. Various modifications and applications may occur to those skilled in the art without departing from the true spirit and scope of the invention as defined in the appended claims.

TABLE 1

| | |
|---|---|
| D1, D2, D3, D4, D13, D14 | MR756 Diode 6 Amp. 600 V PRV |
| D5, D6, D7, D8 | 1N4004/Diode 1A, 400 PRV |
| D9, D10 | 1N4746A/18 V Zener 1 W |
| D11, D12, D16-D25, D27, D28 | 1N4148/Diode |
| D26 | 1N5234B/6.2 V Zener .5 Watt |
| D15 | 22 V Zener 5 w Transorb |
| U1 | LM317T/VAR.V-REG |
| U2 | AN7812/12 V 1A V-REG. |
| U3, U4 | 4N35/OPTI-ISO/6 PIN DIP |
| U8, U9, U5, U6 | CD4020/COUNTER/16 PIN DIP |
| U7 | CD40106/INV.AMP.X6/14 PIN DIP |
| U10, U11 | NE555/TIMER/8 PIN DIP |
| U12, U13 | CD4013/DUAL FLIP FLOP/ 14 PIN DIP |
| U14 | CD4068/8 IN. NANDGATE/ 14 PIN DIP |
| U15 | CA3240/DUAL OP.AMP./ 8 PIN DIP |
| U16 | CD4001/QUAD NORGATE/ 14 PIN DIP |
| U17 | LM324/QUAD OP.AMP./ 14 PIN DIP |
| CR1 | MUR1620/DUAL RECT./TO-220 |
| CR2, CR3, CR4, CR5 | LED/RED |
| Q13 | TL431CLP/SCR |
| RT1 | Thermistor/10 Ohm |
| R1, R2, R38 | 68K ohm 2 watt |
| R3 | 3.3 ohm ¼ watt 5% |
| R4, R5, R11, R18, R19, R27, R44, R40, R45 | 1K ohm ¼ watt 5% |
| R6 | 68.1K ohm ¼ W 1% |
| R7 | 10.0K ohm ¼ W 1% |
| R8 | Undetermined |
| R9 | Undetermined |
| R10 | 220 ohm ¼ W 5% |
| R12, R13, R22, R23, R39 | 1 Meg ohm ¼ W 5% |
| R14, R17, R24, R26, R35, R37, R43, R48, R49 | 100K ohm ¼ W 5% |
| R16 | 5.1K ohm ¼ W 5% |
| R20 | 2.4K ohm ¼ W 5% |
| R29 | 330 ohm ¼ W 5% |
| R28 | 1.5K ohm ¼ W 5% |
| R30 | 2.2K ohm ¼ W 5% |
| R31, R32 | 10.0 ohm ¼ W 5% |
| R15, R21, R25, R33, R34, R36, R41, R42, R46, R47 | 10.0K ohm - ¼ W 5% |
| C1, C2 | 680 UFD 200 V Elect. |
| C4 | 2200 UFD 35 V Elect. |
| C5, C23, C24 | 1.0 UFD 100 V |
| C7 | .47 UFD 250 V Safety UL Listed |
| C9 | 100 UFD 25 V Elect. |
| C10, C14, C20, C22, C31 | .001 UFD 100 V |
| C11 | 330 UFD 35 V Elect. |
| C6, C8, C12, C13, C15, C16, C18, C19, C21, C27, C30, C33, C34, C35 | .1 UFD 100 V |
| C25 | 100 UFD 35 V Elect. |
| C26, C29, C32 | .01 UFD 100 V |
| C28 | 10 UFD 16 V Tantalum |
| C17 | .0047 UFD 250 V |
| Q1, Q2 | IRF 840 |

TABLE 1-continued

| | |
|---|---|
| Q3, Q4, Q7, Q8, Q9, Q10, Q11, Q12 | 2N7000 |
| Q5, Q6 | PN2222A |
| VR1 | 500K ohm Pot (CTS) |
| VR2 | 5K ohm Pot (CTS) |
| SW1 | Voltage selector switch |
| SW2 | Option Sel Switch (3 PIN HDR) |
| P1, P2 | Jumper, Shorting |
| L1 | Line Choke |
| T1 | Transformer, 60 Hz |
| T2, T3 | Transformer, Gate Drive |
| T4 | Transformer, 1st Power |
| T5 | Transformer, 2nd Power |
| T6 | Transformer, Current Sense |
| F1, F2 | Fuse 3 AG 5A Fast-Acting |
| F3, F4, F5 | Fuse 2 AG 2 Amp Pigtail |
| F6 | Fuse 2 AG 2.5 Amp Fast Pigtail |
| L2 | Output Choke |
| TB1, TB2 | 2 POS. barrier strip 6 PCV Series |
| TB3 | 2 POS. barrier strip 4 PCV Series |
| FB1, FB2 | Ferrite bead 2673001601 |
| K1 | Relay 5 Amp Guardian |
| FC1a, FC1b, FC2a, FC2b | Fuse Clip Standard Size |
| C3 | 2.0 UFD 200V |
| FC6a, FC6b | Heat Sink TO-220 |
| J1, J2 | 2 PIN HEADER .100" STRAIGHT |
| J3 | .100" 4 PIN RAFL HEADER |

What is claimed is:

1. In a swimming pool having a water circulation line, a pump for pumping water through said circulation line and a pump timer for activating said pump at a first time and deactivating said pump at a second time, a pool purifying apparatus comprising:
    an electrolytic cell having electrodes adapted for mounting beneath the water level of said pool;
    a conductor for connecting said electrolytic cell to a source of electrical power; and
    a control circuit for controlling said electrical power to said conductor, said circuit sensing actuation of said pump, and connecting said conductor to said source of powder such that power is supplied to said electrolytic cell, said circuit having a timing device which causes the power to said electrolytic cell to be interrupted independently of said pump at a third time different than said second time.

2. The apparatus of claim 1, wherein said timing device is adapted to time the interruption of power to said electrolytic cell such that the difference between said first time and said third time is greater than the difference between said first time and said second time, and wherein both of said differences are less than 24 hours.

3. The apparatus of claim 1, wherein said pump timer is adapted to cause power to be supplied continuously to said pump between sad first and second times, and said control current is adapted to cause power to be supplied continuously to said electrolytic cell between said first and third times.

4. The apparatus of claim 1, wherein said electrolytic cell is mounted in an enclosure, said enclosure being positioned at an outlet of said circulation line such that water from said circulation line flows into said electrolytic cell.

5. The apparatus of claim 1, wherein sad circuit includes a sensing device which detects AC current to the pool pump to detect actuation of said pump.

6. The apparatus of claim 1, wherein said timing device comprises a digital timing circuit.

7. The apparatus of claim 1, wherein said control circuit additionally comprises a shutdown circuit for terminating power to said electrolytic cell when the amount of current in said conductor drops below a threshold level.

8. The apparatus of claim 7, wherein said shutdown circuit is responsive to a threshold level that is about 20% less than the desired current level in said conductor.

9. The apparatus of claim 7, wherein said shutdown circuit comprises means for generating a voltage which is directly proportional to the current through said conductor to permit said current to be monitored by measuring said voltage and a memory element.

10. A method of operating a pool purifying apparatus having an electrolytic cell mounted beneath the water level of a pool, said method comprising:
    energizing said electrolytic cell in response to activating of a pool water circulating pump;
    using said pool pump to continuously circulate the pool water for a first period of time;
    deactivating said pool pump upon completion of said first period of time;
    using said electrolytic cell to continuously purify pool water for a second period of time different than said first period of time; and
    deactivating said electrolytic cell upon completion of said second period of time.

11. The method of claim 10, additionally comprising the step of electrically sensing a fault condition in said electrolytic cell and terminating power to said electrolytic cell in response to the sensed fault condition.

12. The method of claim 10, additionally comprising the step of directing a flow water from a water circulation line connected to the pool pump so that the water flows through said electrolytic cell.

13. The method of claim 10, wherein said first period of time is shorter than said second period of time, and wherein both of said periods of time are less than 24 hours.

14. In a swimming pool having a water circulation line, and a pump for pumping water through said circulation line, a pool purifying apparatus comprising:
    an electrolytic cell having electrodes adapted for mounting beneath the water level of said pool;
    a conductor for connecting said electrolytic cell to a source of electrical power; and
    a shutdown circuit for terminating power to said electrolytic cell when the amount of current in said conductor drops below a threshold level.

15. In a swimming pool having a water circulation line, and a pump for pumping water through sad circulation line, a pool purifying apparatus comprising:
    an electrolytic cell having electrodes adapted for mounting beneath the water level of said pool;
    a conductor for connecting said electrolytic cell to a source of electrical power; and
    a control circuit for controlling said electrical power to said conductor, said circuit comprising a circuit element having two terminals, said circuit element generating a voltage across said two terminals which is directly proportional to the current through said conductor to permit said current to be monitored by measuring said voltage.

* * * * *